United States Patent
Pennypacker et al.

(10) Patent No.: US 9,792,500 B2
(45) Date of Patent: Oct. 17, 2017

(54) FIRE URGENCY ESTIMATOR IN GEOSYNCHRONOUS ORBIT (FUEGO)

(71) Applicant: THE REGENTS OF THE UNIVERSITY OF CALIFORNIA, Oakland, CA (US)

(72) Inventors: Carlton R. Pennypacker, El Cerrito, CA (US); Robert D. Tripp, Berkeley, CA (US); Scott L. Stephens, Walnut Creek, CA (US); Nina M. Kelly, Berkeley, CA (US); Marek K. Jakubowski, Berkeley, CA (US); Mike Lampton, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 126 days.

(21) Appl. No.: 14/927,137

(22) Filed: Oct. 29, 2015

(65) Prior Publication Data
US 2016/0132714 A1     May 12, 2016

Related U.S. Application Data

(63) Continuation of application No. PCT/US2014/036209, filed on Apr. 30, 2014.
(Continued)

(51) Int. Cl.
G06K 9/00     (2006.01)
G08B 17/00    (2006.01)
(Continued)

(52) U.S. Cl.
CPC ........... G06K 9/0063 (2013.01); G06K 9/40 (2013.01); G06K 9/6202 (2013.01);
(Continued)

(58) Field of Classification Search
CPC ...... G06K 9/0063; G06K 9/40; G06K 9/6202; G06K 9/6255; G06K 9/6262; G06T 7/97;
(Continued)

(56) References Cited

U.S. PATENT DOCUMENTS

| 5,832,187 A | * | 11/1998 | Pedersen | G06Q 10/06 340/577 |
| 7,898,458 B2 | * | 3/2011 | Shibayama | G01S 13/90 342/179 |

(Continued)

FOREIGN PATENT DOCUMENTS

| JP | 2005-078566 | * | 3/2005 | ............ G08B 25/00 |
| JP | 2005-078566 A | | 3/2005 | |

(Continued)

OTHER PUBLICATIONS

Korean Intellectual Property Office (KIPO), International Search Report and Written Opinion, Sep. 3, 2014, PCT/US2014/036209, pp. 1-12, with claims searched, pp. 13 to 22. This application U.S. Appl. No. 14/927,137 is a continuation of the foregoing PCT application. The degree of relevance of the non-English language reference listed above is set forth in this English-language search report and, therefore, a separate concise explanation of the relevance is not required.

(Continued)

*Primary Examiner* — Amara Abdi
(74) *Attorney, Agent, or Firm* — O'Banion & Ritchey LLP; John P. O'Banion

(57) ABSTRACT

A fire detector is disclosed that successively images a particular area from geosynchronous Earth orbit satellite to attain very good signal-to-noise ratios against Poisson fluctuations within one second. Differences between such images allow for the automatic detection of small fires greater than 12 square meters. Imaging typically takes place in transparent bands of the infrared spectrum, thereby ren-
(Continued)

dering smoke from the fire and light clouds somewhat transparent. Several algorithms are disclosed that can help reduce false fire alarms, and their efficiencies are shown. Early fire detection and response would be of great value in the United States and other nations, as wild land fires destroy property and lives and contribute around five percent of the US global carbon dioxide contribution. Such apparatus would incorporate modern imaging detectors, software, and algorithms able to detect heat from early and small fires, and yield detection times on a scale of minutes.

19 Claims, 15 Drawing Sheets

Related U.S. Application Data

(60) Provisional application No. 61/817,803, filed on Apr. 30, 2013.

(51) Int. Cl.
*G06K 9/40* (2006.01)
*G06K 9/62* (2006.01)
*H04N 5/33* (2006.01)
*G06T 7/00* (2017.01)

(52) U.S. Cl.
CPC ......... *G06K 9/6255* (2013.01); *G06K 9/6262* (2013.01); *G06T 7/97* (2017.01); *G08B 17/005* (2013.01); *H04N 5/332* (2013.01); *G06T 2207/10032* (2013.01); *G06T 2207/20081* (2013.01); *G06T 2207/20182* (2013.01); *G06T 2207/20224* (2013.01); *G06T 2207/30181* (2013.01)

(58) Field of Classification Search
CPC . G06T 2207/10032; G06T 2207/20081; G06T 2207/20182; G06T 2207/20224; G06T 2207/30181; G08B 17/005; H04N 5/332
See application file for complete search history.

(56) References Cited

U.S. PATENT DOCUMENTS

| 8,369,567 | B1* | 2/2013 | Buck | G06K 9/0063 382/100 |
|---|---|---|---|---|
| 2002/0026431 | A1* | 2/2002 | Pedersen | G06Q 10/06 706/1 |
| 2009/0123074 | A1* | 5/2009 | Chen | G08B 17/12 382/190 |
| 2009/0272888 | A1* | 11/2009 | Nugent | G01D 18/00 250/252.1 |
| 2012/0229872 | A1* | 9/2012 | Dolev | G06F 21/64 358/448 |

FOREIGN PATENT DOCUMENTS

| KR | 10-2011-0067931 | * | 6/2011 | ............. G08B 25/10 |
| KR | 10-2011-0067931 | A | 6/2011 | |
| WO | 2008-016153 | A1 | 2/2008 | |

OTHER PUBLICATIONS

Pennypacker, C. R., et al., "Observations of the Type II Supernova 1986I in M99", The Astronomical Journal, vol. 97, No. 1, Jan. 1989, pp. 186-193 plus slide pp. 313.

Kare, Jordin T., et al., "Automated Search for supernova explosions", Rev. Sci. Instrum. 59 (7), Jul. 1988, pp. 1021-1030.

Kahn, Ronald N., "Desparately Seeking Supernovae", Sky & Telescope, Jun. 1987, pp. 594-597.

Perlmutter, S., et al., "A Supernova at z=0.457 and Implications for Measuring Cosmological Deceleration", Astrophysical Journal Letters, 440, L41 (1995), 21 pages.

* cited by examiner

10:39PST, Oct. 26, 2003   R,G,B: 0.81, 0.66, 0.56μm

10:39PST, Oct. 26, 2003   2.36-2.43μm

Oct. 25, 2003 (DOY298)   (λ = 4.05μm)

Oct. 24, 2003 (DOY297)   (λ = 4.05μm)

Difference in radiance[W m⁻² μm⁻¹ sr⁻¹]

FIRE URGENCY ESTIMATOR IN GEOSYNCHRONOUS ORBIT (FUEGO)

CROSS-REFERENCE TO RELATED APPLICATIONS

This application is a 35 U.S.C. §111(a) continuation of PCT international application number PCT/US2014/036209 filed on Apr. 30, 2014, incorporated herein by reference in its entirety, which claims priority to, and the benefit of, U.S. provisional patent application Ser. No. 61/817,803 filed on Apr. 30, 2013, incorporated herein by reference in its entirety. Priority is claimed to each of the foregoing applications.

The above-referenced PCT international application was published as PCT International Publication No. WO 2014/179482 on Nov. 6, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in a text file entitled "BK_2011_081_2_US_source_code_listing.txt" created on Oct. 29, 2015 and having a 19 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

This technology pertains generally to fire detection, and more particularly to fire detection from an imager in geosynchronous Earth orbit, low Earth orbit, or high altitude unmanned (or even manned) aerial vehicles (UAVs).

2. Background Discussion

Current and planned wildfire detection systems lack both sensitivity and rapid response times. These limitations result in missing the initial stages of a fire, and allow such fires to grow to potentially unmanageable sizes.

BRIEF SUMMARY

This technology uses at least two images of Earth's surface, where at least a subset of the images overlap the imaged surface. The two images are taken at some periodic sampling interval, where without limitation, the shorter the sampling interval, the better.

The images are taken by an imager. This may be an infrared (IR) imager to better pierce through smoke generated by a fire. The imager may be satellite based, in geosynchronous or low Earth orbit, or may also be an unmanned aerial vehicle (UAV). The UAVs envisioned here may fly at an altitude of around 19,812 m to have a relatively large view of the Earth's surface. The imager takes images of the Earth's geography to detect hot spots that may be indicative of fires.

Dithering of the imager may be used in the acquisition to improve the quality of the images, or to remove artifacts of image acquisition or processing.

The two images in the overlapped imaged ground are subtracted to find a subtracted difference in image radiance. A histogram may be built of the pixels in the subtracted difference image.

Outliers found in the histogram will generally have higher radiance values than the main background of the subtracted difference image. Such outliers are then deemed as fire candidate pixels.

A series of exclusion tests are then performed on each candidate pixel. Each test represents a heuristic method of detecting what is not a fire. Those fire candidate pixels that fail one or more of the heuristic tests may be removed from the list of fire candidate pixels.

The remaining fire candidate pixels, which have passed most or all of the heuristic tests, may be evaluated with a cost function relating to projected property damage, loss of human lives, loss of endangered wildlife habitat, size of the fire surrounding the fire candidate pixel, and the like.

Some of the heuristic tests may incorporate the evolution of a fire candidate pixel into its temporally or spatially adjacent pixels through comparisons with additional input images.

Fire candidate pixels exceeding a previously input cost reporting threshold may be communicated to the Earth ground station via typical platform uplink and downlink communications.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 6C is a histogram of FIG. 6A, showing the frequency versus subtracted radiance of particular regions of FIG. 6A, and indicating that at night, the background, desert, and ocean curves are nearly similar.

DETAILED DESCRIPTION

1. Introduction 1.1. Overview

Figure 1A:
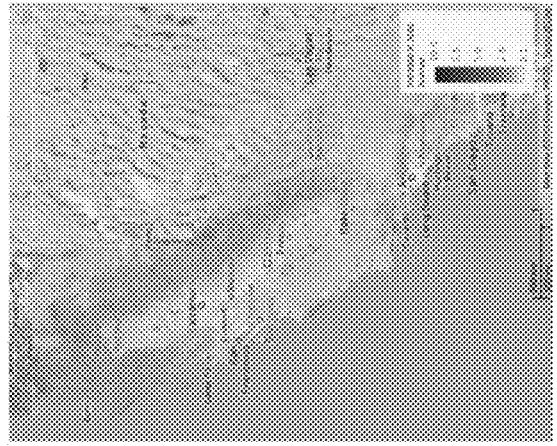
FIG. 1A is a map of California's projected ratio of additional fire risk for an area as compared to the expected burned area for each grid cell for the year 2020.

Fire managers have to make difficult decisions about the allocation of resources for fire suppression. Allocations of suppression resources are based on numerous factors, including consideration of: the number of fires, fire location, potential fire damage to homes, fire impact on human life, and fire harm to natural resources. In the US, this is done at the Boise National Interagency Fire Center (NIFC) for all federal agencies. The ability to provide fast, reliable information on fire locations, especially when they are very small (<10 m$^2$), would enhance fire management greatly, and potentially lower fire suppression costs.

Currently, fire managers rely on diverse sets of information to assess the location of fires. These include information on lightning strike locations, observations of fires from aircraft and fire lookouts, and on-the-ground observations from field personnel and the public. This network of data is not ideal for catching small, nascent fires, and the US federal government spends greater than $1 billion annually on fire suppression ($2 billion in 2012, a record amount), not including the losses of property such as homes, damage to the ecosystem, loss of lives, and other destruction. One estimate, "Preliminary Assessment: The Economic Impact of the 2013 Rim Fire on Natural Lands, Report Version 1.2", dated Nov. 26, 2013, with authors David Batker, Zachary Christin, Rowan Schmidt, Isabel de la Torre, prepared by Earth Economics, 107 N. Tacoma Ave., Tacoma Wash. 98403, estimates that the total damage is eight times the fire suppression costs.

The current system for fire detection would be significantly enhanced by a platform that could detect the location of small, nascent fires across very large areas. This invention describes a next-generation technique of fire detection that holds the potential to give quantitative measures of intensity and rate of growth of every fire within the field of view within minutes. California is used as an example due to its frequency and intensity of fires, frequently near urban centers.

1.2 Technological Enablers and Challenges

Over the last decade, advances in infrared imagers, particularly in Mercury-Cadmium-Telluride ("HgCdTel"), has enabled the regular use and implementation of arrays of multiple 2K×2K pixel$^2$ (or larger) imagers. Such arrays allow larger areas to be studied for small changes in brightness, which may be due to a new fire.

Fire signatures can be distinguished from a number of backgrounds and characterized by algorithms discussed herein. These algorithms and tests are essential, as the statistical or systematic fluctuations due to small changes could lead to a small excess (~2% to 3%) in the 3.9 µm infrared band that could swamp the desired signal. Hence, designs and algorithms that hold promise for suppressing the quantity and quality of false alarms are discussed. A number of other techniques that should assure satellite functionality are also discussed.

1.3. Fire in California

The western United Sates and California in particular have a specific and urgent need to assess fire outbreaks. Fire has long been a part of the Californian landscape. In many fire-adapted ecosystems, fire promotes vegetation and wildlife diversity, releases nutrients into the soil, and eliminates heavy accumulation of underbrush that can fuel catastrophic fires. But a century of fire suppression has left some areas of the state prone to catastrophic fires, especially in forests that once experienced frequent, low-moderate intensity fire regimes.

Large, high intensity fires also occur almost every year in the southern California chaparral. These fires are pushed by severe Santa Ana winds placing thousands of homes at risk annually. Additionally, projected California climate changes are likely to have large consequences on the frequency, size, and type of fire in the state, with bigger, more dangerous fires resembling those encountered in Southern California instead erupting in Middle and Northern California.

California provides an example in the American West of extremes in fire extent and predicted change with a changing climate. California is well known for its high number of annual fires throughout the state.

Figure 1B:
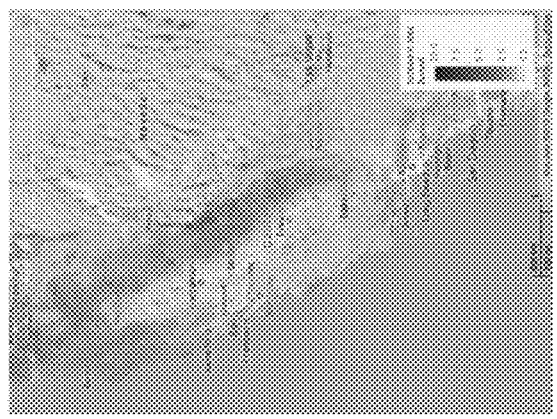
FIG. 1B is a map of California's projected ratio of additional fire risk for an area as compared to the expected burned area for each grid cell for the year 2050.
Figure 1C:
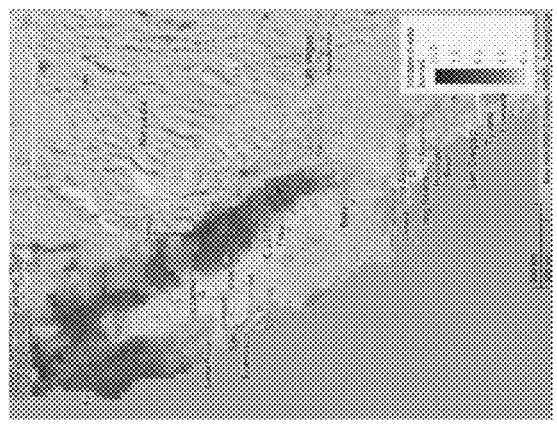
FIG. 1C is a map of California's projected ratio of additional fire risk for an area as compared to the expected burned area for each grid cell for the year 2085.

Refer now to FIG. 1A though FIG. 1C, which respectively show a map of California with a projected ratio of additional fire risk (due to increases in temperature) for an area as compared to the expected (without increases in temperature) burned area for each grid cell for the years 2020, 2050, and 2085.

Here, the projected increase in potential area burned is given by one Intergovernmental Panel on Climate Change climate model (called the Geophysical Fluid Dynamics Laboratory (GFDL) model), under one emission scenario (called the A2 scenario, which calls for regionally oriented economic development and high emissions). In FIG. 1A through FIG. 1C, higher densities suggest up to a 10-fold increase in potential area burned in 2020, 2050 and 2085.

These data are modeled solely on climate projections and do not account for changes in landscape and fuel sources. Newer fire risk projections are currently being produced that take into account more landscape information. Despite this shortcoming, the extent and severity of fire will clearly continue to be of critical importance to Californian landscapes. Forest and chaparral landscapes appear to be particularly at risk in the future.

Currently, California, like other western states, has field crews, some fire-retardant bombers, and firefighting personnel. However, California lacks a reliably deployable method for the very early (within seconds or minutes after threshold) detection of the initial phase of fire outbreak.

1.4. Current Wild Land Fire Detection

Fire detection in the US was once based on people positioned in lookouts that were dispersed throughout the wild lands in the US. This practice occurred for over 50 years but has diminished in the last 10-20 years. Today many forest managers have access to a lightning detection network (Vaisala Inc., see www.vaisala.com/nldn30/). This system estimates the location of lightning discharges and provides a map of their locations. With this map, forest managers can dispatch aircraft to determine if lightning fires occurred, or field personnel can be sent to the locations to determine if a fire has in fact started.

In some areas fire lookouts are still used, especially in areas with high fire incidence. With the rapid increase in cell phones, many fires are also reported by the public. There is a time-lag for all such systems in their ability to accurately report fire locations. Thus, early fires are often undetected, and the current fire detection system could be improved. A system that could do this for large geographical areas and in short time frames would significantly enhance fire management.

1.5. Fire Spreading Rate

Figure 2:
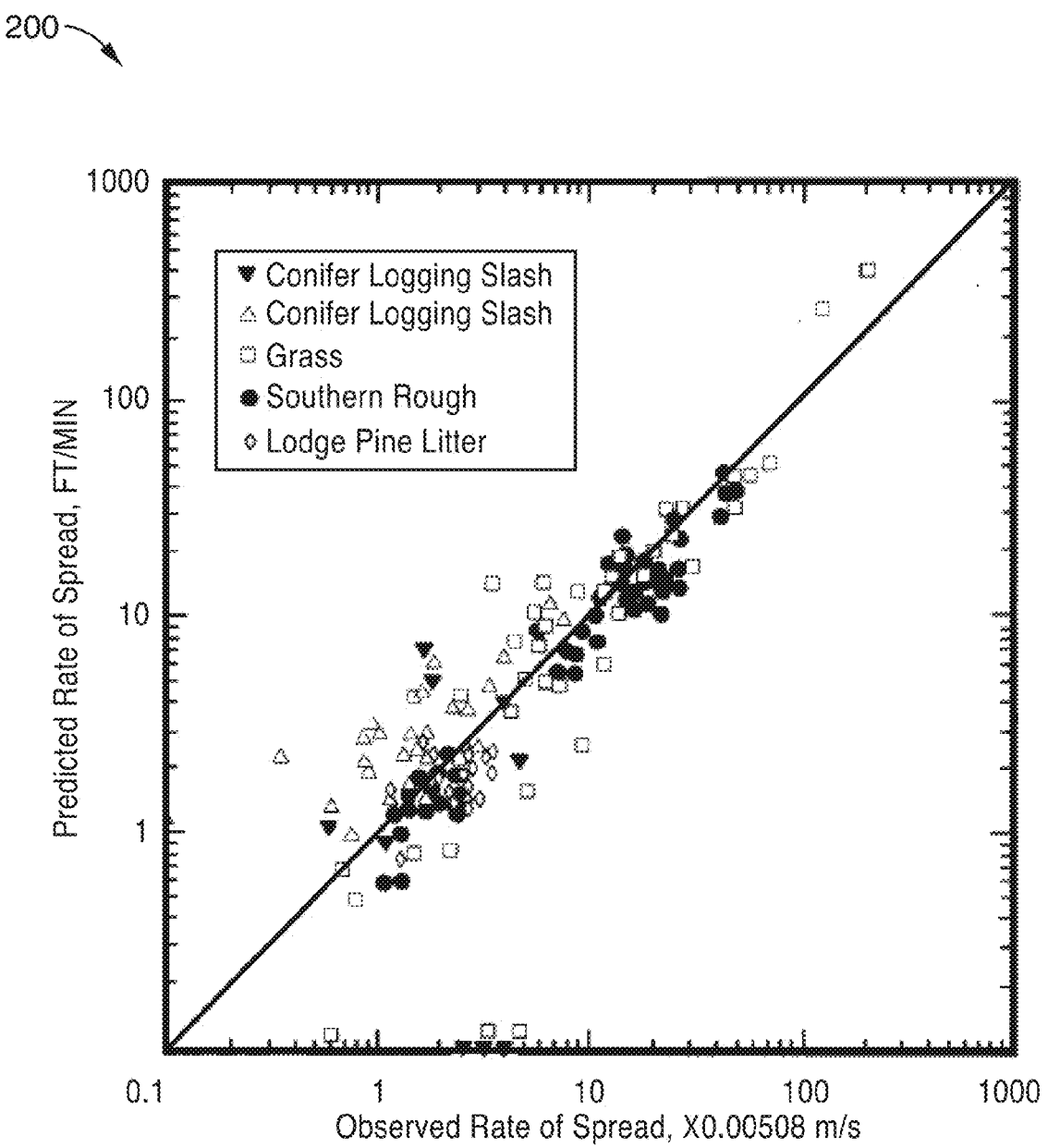
FIG. 2 is a log-log graph of typical fire spreading rates.

Refer now to FIG. 2, which is a log-log graph 200 of typical fire spreading rates. Wild land or near-urban fire spread rates vary by more than two orders of magnitude. FIG. 2 shows the diversity of spread rates, from less than a foot (0.3048 m) per minute to more than 100 feet (30.48 m) per minute.

Some of the variables in the models used to generate FIG. 2 include wind speed, fuel, and moisture content. A fire starting in an area with abundant dry fuel and Santa Ana winds would tend to spread quickly. Additionally, there also are definite changes in the spread rate within a single fire. For example, the Oakland Fire smoldered overnight, at a very slow spread rate (however, with a potentially detectable FUEGO signal), and then erupted into a catastrophic fire driven by Diablo Winds.

Fire detection on a scale of minutes would be useful in many cases. However, the response time of airborne fire-retardant bombers is probably about 15 minutes for fires relatively near such bomber airports, so this response time factor sets a lower floor in many cases on how quickly fire response systems can react.

If a fire spreads at 100 feet or more per minute (such as might occur in grass during Santa Ana conditions), responding within a time scale of minutes allows fire retardant bombers to respond on their own time scale, and the fire would still likely be manageable by the time the bombers arrive.

However, if a fire alert arrives in 15 minute or (worst case) a half hour before fire-retardant bombers reach the fire, under such conditions, the fire can approach km-scale sizes or larger, and would be much more difficult to manage, compared to the 500-yard (152.4 m) size with a one minute alert.

Additionally, if FUEGO detects a fire, monitors its size, and determines how fast it is spreading, such data would likely be extremely useful in planning and managing the firefighting efforts.

1.6. Fire Detection with Remote Sensing

Atmospheric transmission windows in the near and mid-infrared are adequate for detecting fires. Fires cannot be seen under heavy cloud cover, and can be detected with reduced sensitivity under smoke and thin clouds, depending on the wavelength of the detectors, smoke particulate size, and moisture content of the atmospheric column. The most serious conditions for California are the autumnal Santa Ana winds which are persistent, clear, and very dry. Under these conditions the satellite detection and warning system disclosed here might soon pay for itself in savings of lives, property, eco-system damage, and fire-fighting costs.

1.6.1. Fire Detection from Low Earth Orbit

The past fifty years of Earth observation from satellite imagery has shown the value of space based detection and measurement of fire outbreaks. For example, the MODIS instruments (see the United States National Aeronautics and Space Administration for information on the Moderate Resolution Imaging Spectroradiometer) on the Aqua and Terra satellites routinely map fires, with pixels representing a 1 $km^2$ observed size. MODIS surveys any given region on Earth approximately once every one to two days. MODIS has 36 bands, and its data from several of its bands were used to derive and test the fire detection algorithms described below. Because of the poor time resolution (24-48 hours) of the MODIS sensors, such detection does not help in early-warning for fires.

ASTER is one of the five state-of-the-art instrument sensor systems on-board the Terra satellite launched in December of 1999. It was built by a consortium of Japanese government, industry, and research groups.

ASTER monitors cloud cover, glaciers, land temperature, land use, natural disasters, sea ice, snow cover and vegetation patterns at a spatial resolution of 15 to 90 m per pixel. The multispectral images obtained from this sensor have 14 different bands, including near infrared, short wave infrared and thermal infrared.

Figure 3A:
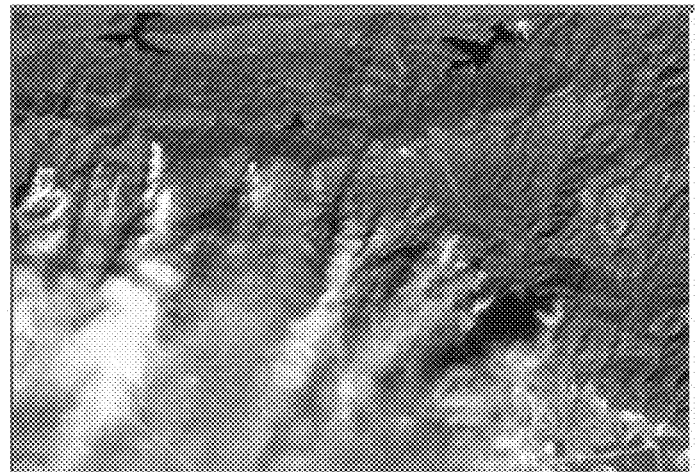
FIG. 3A is a near-infrared (here, 0.56 μm wavelength) satellite image collected during the Grand Prix fire on Oct. 26, 2003 by the ASTER sensor.
Figure 3B:
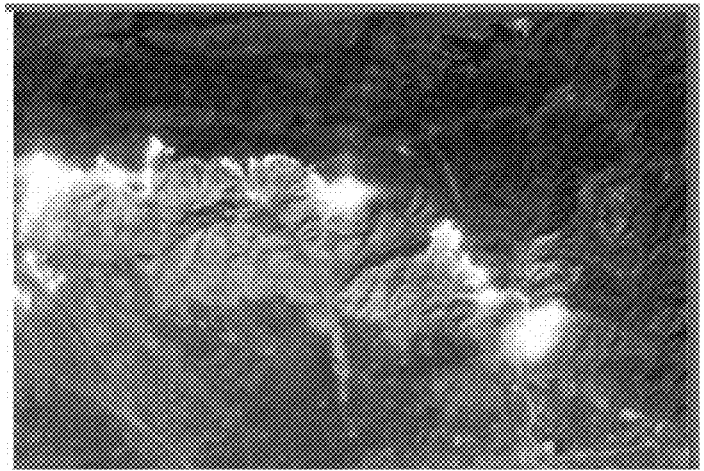
FIG. 3B is a mid-wave infrared (here, from 2.36-2.43 µm wavelength) satellite image collected during the Grand Prix fire on Oct. 26, 2003 by the ASTER sensor.

Refer now to FIG. 3A and FIG. 3B, which are respectively a near-infrared image and mid-wave infrared satellite image collected during the Grand Prix fire on Oct. 26, 2003 by the ASTER sensor. It is seen that the smoke emitted by the fire is observed to be nearly transparent in the mid-wave infrared satellite image.

The Grand Prix fire is a typical California fire. It began in dense brush, burned through foothills, and over mountain tops into a number of canyons that are surrounded by homes. It destroyed 13 homes (including 2 mobile homes) and damaged 9 others in Alta Loma, Calif. Such fires have routinely caused hundreds of millions of dollars in damage a year over the past 20 years, with some major fires causing over a billion dollars of damage in lost housing.

Such low-Earth orbit satellites as ASTER and MODIS can find fires, but a given area of interest can only be viewed on the sensor's return schedule, and the target fires are typically large.

The BIRD Satellite of the German Deutsches Zentrum für Luft- and Raumfahrt (DLR) was launched as an optimized fire detection satellite in 2002, in a 568 km altitude orbit. With its pixels projected to a linear dimension of 185 m on Earth, it could detect a 4 meter radius hot fire on the ground with no other false alarms in the background. BIRD used HgCdTel 2×512 pixel$^2$ (nearly) linear array. "Easter Fires" across Austria were easily detected. Bush fires in Australia proved to be a source of signal.

1.6.2. Fire Visibility from Geosynchronous Orbit

The Cooperative Institute for Meteorological Satellite Studies (CIMSS) at UW-Madison, and in particular Elaine Prins, started doing geostationary fire detection using GOES-8 data in 1995, which was a seminal effort to introduce regular geostationary detection of fires from space. That work led to an operational fire detection and characterization product for current GOES as well as Eumetsat's Meteosat Second Generation (MSG) and Japan's Multi-function Transport SATellite (MTSAT).

Support for another GOES-like geostationary platform, Korea's Communication, Ocean, and Meteorological Satellite (COMS), has also been implemented. The fire detection and characterization data provided by CIMSS' Wild Fire Automated Biomass Burning Algorithm (WFABBA) has found use in a variety of applications, from real time monitoring of wild land and agricultural fires to use as emission source information for air quality models.

The WFABBA provides information about the fires, including detection confidence level, and in cases where it appears appropriate, the instantaneous fire power, size, and temperature estimates. WFABBA corrects for atmospheric attenuation and attempts to identify opaque clouds and viewing conditions that hamper or prevent fire detection.

The WFABBA's primary strength is its ability to quickly process real-time data from a variety of satellite platforms, though it is limited by the sensitivity and optical properties of the data acquisition instrument and the size of the pixel footprint (4 km×4 km–16 km$^2$—at the sub-satellite point to ~20-25 km$^2$ over much of the United States), of which fires often represent a very small fraction.

Other groups have succeeded at fire detection with geostationary platforms as well. As noted earlier, MSG data has been used to analyze time sequence 3.9 µm heat data and perform change detection using a Kalman filter. This group could detect fires of 75 megawatts.

Previous work has used images from MSG2-SEVIRI in fire detection and fire-fighting management. During the summer of 2007, a number of severe fires consumed 6% of Greece's vegetated land Images. Existing fire-detection algorithms for SEVIRI were able to detect 82% of wildfires in Greece at this epoch, with a 1% false alarm rate.

One goal of the present technology described herein is to develop one or more on-orbit continuous sensors keeping the Continental United States (CONUS) or a more restricted region such as the Southern California Fire Critical Region under nearly continuous observation. A goal of FUEGO is to lower the hundreds of megawatts of fire radiative power sensitivity of GOES and other current geostationary platforms down to a level of a megawatt or less with a dedicated system. GOES was designed as a general-purpose climatological and weather monitoring system, and was not specifically designed to detect fires, and thus does not have the false candidate mitigation, the exposure cadence, the re-imaging, and other aspects of a dedicated fire detection instrument.

1.6.3. GOES R and Fires

While the Imager on the current GOES was not designed with fire detection in mind, the Advanced Baseline Imager (ABI) on the next generation GOES, known as GOES-R, had requirements for fire detection from the beginning of its development. ABI has a nominal resolution of 2 km at its subpoint and will scan the full disk every 15 minutes. Every 5 minutes it will provide coverage of CONUS, and "mesoscale" sectors will be available as often as every 30 seconds.

The WFABBA team from CIMSS developed the ABI Fire Detection and Characterization Algorithm (FDCA). The FDCA takes advantage of the improved temporal and spatial coverage of ABI, and studies with proxy data suggest that, like the work by Van den Bergh, the typical minimum detectable power output is 75 MW. Like MSG, MTSAT, and the older GOES satellites that have been stationed over South America in recent years, ABI data will be remapped to a perfect geostationary projection. That remapping, in combination with the multi-purpose nature of GOES, does limit the ability of ABI to detect fires.

While ABI can scan a region every 30 seconds, the FDCA was not specified as a product to be produced when "mesoscale" scans are made, so fire detections may not be available from NOAA on that schedule. Additionally, the "mesoscale" scan mode will primarily be used for thunderstorms, hurricanes, and other major events, and, at least as currently specified, will infrequently be used to monitor fires. As the next generation WFABBA the FDCA is expected to provide better fire detection and characterization, but ABI is still a multi-purpose instrument of which fire detection is just one of dozens of products.

2. A Proposed FUEGO System

A framework for a next-generation technique of remotely sensed fire detection that will give an immediate quantitative measure of intensity and rate of growth of every fire within the field of view is now described. The FUEGO system would combine several technologies:

1. Multispectral sensing using newly available large format HgCdTe sensors;
2. Rapid mathematical classification of trends using subtraction of images from a few seconds to minutes before, dithering of images to improve resolution, and other spectral and time domain algorithms to reject false alarms;
3. Onboard software and computational hardware that can yield calibrated decisions;
4. Time-sensitive autonomous, multispectral adjustment of detection thresholds that deliver robust detections with low false alarm rates in the face of constantly varying conditions; and
5. Precision space craft pointing and replicability for robust image acquisition.

Figure 4:
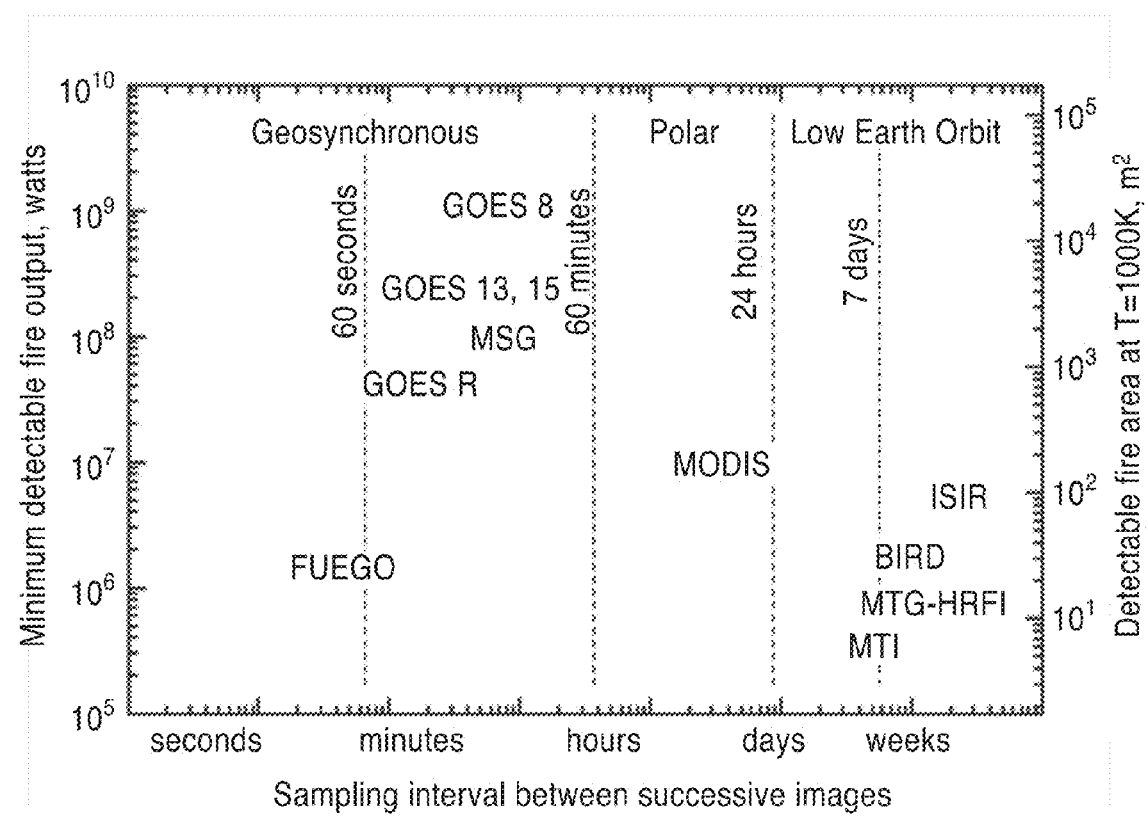
FIG. 4 is a graph of an approximate minimum fire power emitted (in watts and a logarithmic vertical axis) that can be seen by various generations of satellites versus the sampling interval between images for existing and planned satellites.

Refer now to FIG. 4, which is a graph 400 an approximate minimum fire power emitted (in watts and a logarithmic vertical axis) that can be seen by various generations of satellites versus the sampling interval between images for existing and planned satellites. Here, a comparison of a dedicated instrument such as FUEGO can be compared to the multi-purpose GOES satellites. FUEGO can approach such sensitivity because of its complete control of telescope viewing targets and telescope operations. It does nothing except to search and study fires.

FIG. 4 shows a comparison of prospective FUEGO performance versus existing and planned satellites, including: "BIRD" Bi-spectral IR Detection; "FUEGO" Fire Urgency Estimator in Geosynchronous Orbit; "GOES" Geostationary Operational Environmental Satellites; "ISIR" Infrared Spectral Imaging Radiometer; "MODIS" Moderate Resolution Imaging Spectroradiometer; "MSG" Meteosat Second Generation; "MTG_HRFI" Meteosat Third Generation High Resolution Fast Imagery; and "MTI" Multispectral Thermal Imager.

For the FUEGO system, preliminary calculations and tests with real data of the design of such a system to advance fire detection efficiency are shown. The term "efficiency" is intended not just as a sensitive detection threshold, but also a low probability of false alarm rate, because without controlling false alarms, fire detections would be unreliable.

Here, the "first minute" is specifically targeted. The "first minute" is that period of time when a fire outbreak (natural—or caused by arsonists) could be brought under early control by a rapid remedial action, and when costs of life and property could best be minimized.

A systems-engineering description of fire detection urgency estimation criteria can be organized in terms of three factors: 1) the probability that an early detection event will become a fire; 2) the potential impact on lives and property loss of a fire at a location and time; and 3) the ability of a system to provide early outbreak warnings to responders.

Here, factor 3 is discussed. A baseline concept for an early-warning satellite has been created, and then, using existing archival images of relevant background scenes and fires, algorithms and systems for detecting a fire while ruling out false alarms has been tested.

The core of one embodiment of the FUEGO system involves calculations that utilize matched filters, successive least-square fittings of candidate fires to expected fire signatures, or both matched filters and curve fittings of candidate fires. Such calculations could be performed on-satellite, ground-based, or some mixture of the two.

Each single pixel fire candidate is then evolved into comparisons against tens or even hundreds of adjacent pixels in either time, space, or both, using multispectral, multiple time sequences of images of the same geographic location.

That is, both the record of images (and previously detected false candidates) taken long before and almost immediately before the outbreak are compared to images taken at the outbreak. Such image acquisition strategy will mitigate slowly varying noise in the background and troublesome areas that produce more false alarms. The proposed FUEGO system would comprise three major components: 1) signal to noise calculations, 2) rejection of false alarms, and 3) real-time treatment and follow-up of candidates.

2.1. Signal to Noise Calculations

Even a relatively small fire signal can yield a large signal to noise ratio against the solar background. Table 1 indicates some of the supporting calculations that demonstrate some of these details. Here, the rationale for identifying payload elements is reviewed and offers a minute-by-minute data harvest from which initial fire alerts can be obtained, with sufficient ancillary data to control the false alarm rate. An important concept applied here is to image the surveillance zone (assumed to be the continental USA) in several wavebands that include the visible (for identifying daylight clutter), in the near-infrared, mid-infrared, or both near-infrared and mid-infrared, where thermal emissions from typical fires reach a peak.

Four scenarios apply to this objective:
1. Fire detection at night; clear or lightly overcast sky;
2. Fire detection at night, with heavy cloud cover, smoke, or a combination of heavy cloud cover and smoke;
3. Fire detection during daytime, clear or lightly overcast sky; and
4. Fire detection during daytime, with heavy cloud cover, smoke, or a combination of heavy cloud cover and smoke.

Traditional fire detection from ground, air, and space uses smoke trail detection in the visible during daytime hours because such trails are typically much larger than the fire and are highly visible in the 0.4-0.6 µm waveband. At night, the smoke trail is invisible and space borne fire sensing techniques use infrared wavebands, particularly the 3.9 µm band, when the highest sensitivity is needed.

Any space borne fire sensor system will face a far more challenging detection situation in cases 3 and 4 above, compared to the nighttime fire cases, owing to the Earth's reflected sunlight.

The Earth reflected radiation spectrum covers the visible and infrared (IR) bands with a sufficiently high flux so as to make the IR fire signal detection a challenge, especially from the 36,000 km distance of a geosynchronous satellite location. There are several components within this daytime interference: structural variation in albedo spectrum owing to spatial gradients in ground cover and terrain slopes; time variation in albedo owing to local wind, foliage motion, cloud motion and shadowing; and the enhanced noise level for a sensor system exposed to a bright foreground flux. For these reasons, a simplified version of case 3 above is explored, which is demanding enough to constrain the payload properties and detection planning issues, and (unlike scenario 4) is quantitative enough to allow a concrete basis for analysis.

A key ratio is the observed signal from the fire divided by the signal from midday Earth. This ratio must be large enough that the fire detection can take place with a high probability of detection and a very low probability of false alarm. There are three principal contributors to the key ratio: (a) the aperture of the telescope (that determines its light gathering power—and equally significant, its diffraction pattern size); (b) the waveband in which the image will be created; and finally (c) the finesse with which the image is pixelated. It is a common requirement in remote sensing (as well as astronomy) that to recover the information in an image, the image should be sampled with at least two pixels across the diffraction pattern diameter.

It has been found that the noise in subtracting a reference image from a new image yields artifacts that are not distributed according to Poisson statistics. Such Poisson statistical calculations serve to show a noise floor one may ultimately approach.

Here, a fire signal is about 3% of the background signal. It is recognized that Table 1 portrays a highly simplified picture of any real fire situation. In reality, a fire is parameterized by a number of important factors, such as smoke, visible emission, infrared opacity, etc., each of which modify its spectrum. A Planck spectrum formulation is presently adopted as a convenient way to explore alternative mission configurations, while in the future it is expected to extend this work to include a more realistic family of fire spectra, day illumination spectra, and clutter distributions. The positive result of the BIRD satellite finding 4 m×4 m fires shows potential for the FUEGO system.

The algorithms described below must then discover how signals that are a fraction of the background can be discovered against this background of both Poisson and systematic noise.

To proceed toward a detailed detection strategy, it is noted that at any moment there may be many distinct evidence trails available on board the sensor spacecraft: for example, (a) a succession of visible images from which a pixel-by-pixel variability index can be reliably estimated, to establish the effective noise level originating from glints, glare, cloud cover, and local wind-driven color and brightness changes; and (b) a succession of IR images whose statistical variability indicates the recent history and stability of the IR noise level. There is also the capability of making very small pointing (sub-resolution element) to dither the image and mitigate artifacts of under-sampling. Such IR data are of course also affected by local conditions but in addition, they (unlike the visible) are highly sensitive to the outbreak of a small-scale fire.

A fire is detected at a position in the satellite field of view when several conditions exist: (a) the visible noise level determined for that location is small and its trend line has only a small derivative; (b) the IR noise level for that same location is small and its trend line has only a small derivative; (c) a new IR image frame shows a statistically significant brightening at that location with no concomitant disturbance in its visible signature; and (d) the candidate survives dithering and multiple image acquisition, to rule out subtraction artifacts.

For example, if the previous dozen frames show a consistent noise level due to a scene variability of 1%, and if a new IR image frame shows a consistent 3% rise in signal for a highly localized region, the detection will be highly significant and the false alarm rate will be correspondingly low.

2.2. Rejection of False Positives.

2.2.1 Utilizing Inherent Information in the Signal to Reject False Alarms

The proposed FUEGO method relies on finding critical differences between a pixel at various times and itself and its neighbors through a series of tests. That is, one important aspect of FUEGO is to convert a single pixel event into dozens of independent confirmable tests, with minimal re-imaging.

First, the inherent background flux of each pixel needs to be determined. A pixel in the 3.9 µm band must be rising above the average of its 100 previous trend points (or some other number based on experience, or a number that can be adjusted for particular conditions). For example, one might fit a smooth function $f_n(t)$ to $B_n(t_i)$ that is the brightness of a pixel n in its $i^{th}$ image as a function of time. Such a functional curve would account for gradual variations in the pixel's day and night pattern, for brightening and darkening, and shadows.

Some statistical uncertainty would be associated with each data point (pixel m in the following). If an average error bar is s, then a deviation $(B_m(t_i)-f_m(t))>10\sigma$ (where $\sigma$ is a standard deviation) would be very significant, even with the large image being searched. The previous day or night trends and any standard hourly variations should be taken into account, as well as the temporal variance of the signals themselves. This is called the "self test" since it depends only on the historical flux from the target spatial pixel m.

Second, the pixel in its 3.9 µm band must depart from its eight immediately surrounding pixels at 3.9 µm. This is called the "Laplacian test" since the 2D Laplace operator is proportional to the difference of intensities I(center)-(⅛)*Sum(all eight surrounding pixels), and finds a spatial location that is starting to be anomalous from its neighbors.

Third, the Laplacian pixel flux in visible or near IR wavelengths should not deviate by more than 3 $\sigma$ (standard deviations) or so when compared to the pixel that appears brighter. That is, if a pixel appears to be a fire, since it has been caught early, it cannot have spread to more than one pixel, and multiple pixels above threshold would undermine the quality of this event. This would tend to eliminate false alarms from cloud cover changes and other sources that change the exterior illumination from sunlight.

Fourth, the cost-benefit test: Does a fire in this region cause significant damage to wild lands or civilization? What are the immediate and long term costs that arise from such a fire? Such tests are not described here, but could be readily created.

2.2.2. Image Subtraction and Related Algorithms

Algorithms are described below that hold potential for reducing the false alarm rate due to systematic and random effects in FUEGO images. As noted earlier, one aspect of FUEGO is its capability to compare many images of an event to rule out false alarms, by a variety of algorithms. Pixel by pixel optimal subtractions of reference images (meaning images without fires) from newly acquired images gives tremendous power, and candidate fires must survive the subtraction process.

For example, a system is planned where successive images or combinations of images, are subtracted from each other, and false alarms and candidates are characterized and tracked.

Specifically, one fire detection embodiment is when an initial fire candidate is found from successive subtractions. To qualify as a real fire, the fire candidate must increase its signal through successive images. An initial statistical significance of at least 10 $\sigma$ (this could also be 3, 5, 7, 10, 12, or more $\sigma$) above the noise in the subtracted image might be a threshold before the next test. With modern data bases and candidate handling protocols, such images may be archived and calculated from algorithms from previous images (ranging from 1, 3, 5, 7, 10, 15, 20, 30, 45, to 60 or more minutes earlier) or may be as short as images from shorter than a few seconds or longer (ranging from 1, 3, 5, 7, 10, 15, 20, 30, 45 to 60 seconds earlier), compared to previous images.

The "Point Spread Function" or PSF is a standard characterization for describing optical and system performance. The PSF uses a true point (one at infinity) whose image is converted into a two-dimensional function in the focal or image plane. FUEGO could experience some image-to-image comparison difficulties, due to a varying PSF across the image plane. That is, a point source in one part of the focal plane may manifest itself as light spread out over multiple pixels corresponding to a $PSF(x_1,y_1)$. If the point, or fire, is imaged at another position on the focal plane, $PSF(x_2,y_2)$ could be different, and this could create false fire alarms. Such behavior could be accounted for in more complex PSF fitting schemes ("Optimal Image Subtraction" or OIS) as described later in section 3.3.

2.2.3. Follow-Up of Candidates

It is realized that fires can be single or adjacent pixel events. If, for example, more than one spatially non-contiguous pixel lights up significantly above the noise, such an event is characterized as a false alarm. The "Laplacian" test above would be applied here.

More capabilities for "drilling down" through the noise are available. For candidates that survive subtraction algorithms, the ratio of signal in the infrared wavelengths compared to optical signals is used to rule out changes in the background due to changes in solar irradiance.

Measurement of energy from a fire target in multiple bands as a function of time, and fitting the time evolution of the difference signal to an expected fire template for that region may be used for fire detection. That is, the candidate fire may be measured in Visual, and infrared K, and L band, for example, and the evolution of the signal from first detection may be monitored to validate a fire. Fires will have a definite signature, and if the candidate fire does not fit this signature, it is ignored.

With real time candidate handling, and precision spacecraft control, FUEGO has the capability of taking multiple images, where each image is shifted by a small fraction of a pixel, and then measuring and analyzing the behavior of the candidate at slightly different pointings. The FUEGO camera would be moved by a fraction of a pixel, and a new image would be acquired. This could rule out slower spreading fires.

Other algorithms may be useful, such as subtracting a smoothed version (smoothing over, for example, an extent of 4×4 pixels of the new image from itself, the "treated new image"), and then a smoothed image of the reference image from the reference images (the "treated reference image"), and then subtracting the treated reference image from the treated new image. This method tends to eliminate noise due to low frequency changes in the background illumination.

Finally, if necessary, the use of a ground system of lasers (without limitation IR in bandwidths of interest) could point at the satellite (since the satellite telescope has no moving parts), thereby allowing images to be precisely aligned over successive pointings by collocating the lasers.

3. Exploring the Proposed FUEGO System 3.1. Examples of Fire Detection with MODIS Mid-wave IR (4.05 µm) images from the MODIS instrument over the Cedar Fire were used to test the fire detection system. The Cedar Fire was a human-caused wildfire that burned out of control through a large area of San Diego County, Calif., in October 2003. Below are two scenarios presented (day and night) where fires were detected.

The first is a worst-case detection scenario, where fires were detected within imagery collected in the middle of a clear day. All following dates will be reported in local time: Pacific Standard Time.

Figure 5A:
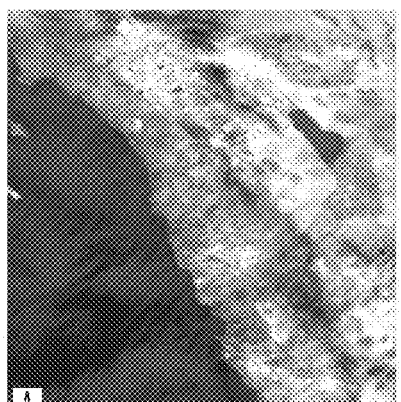
FIG. 5A is a 4.05 µm MODIS image of the Southern California region acquired on day 298.
Figure 5B:
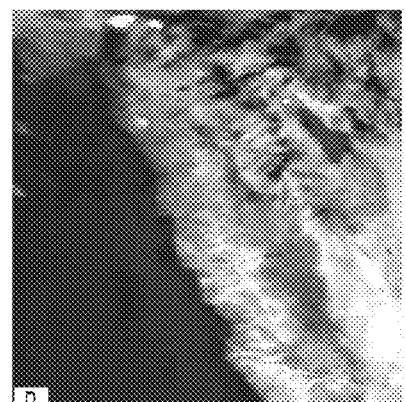
FIG. 5B is a 4.05 µm MODIS image of the Southern California region acquired on day 297.
Figure 5C:
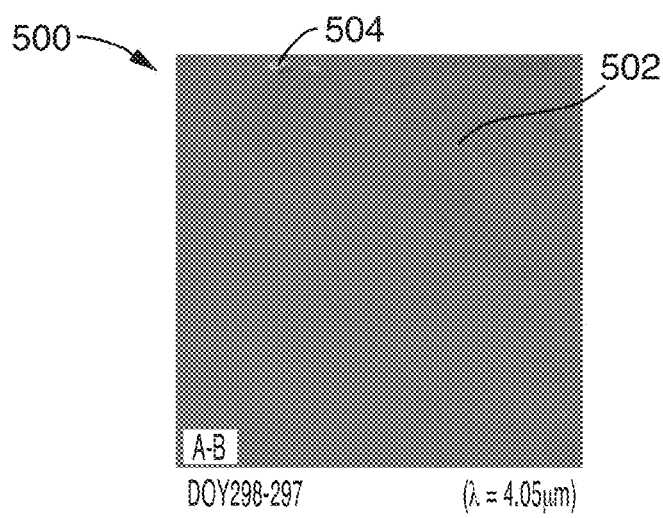
FIG. 5C is an image created by subtracting the image of FIG. 5B from FIG. 5A, indicating a small fire and a large fire (the 2003 Grand Prix fire).

Refer now to FIG. 5A through FIG. 5D. FIG. 5A and FIG. 5B are 4.05 µm MODIS images of the Southern California region respectively acquired on days 298 and 297. FIG. 5C is an image 500 created by subtracting the image of FIG. 5B from FIG. 5A, indicating a small fire 502 and a large fire (the 2003 Grand Prix fire) 504.

Figure 5D:
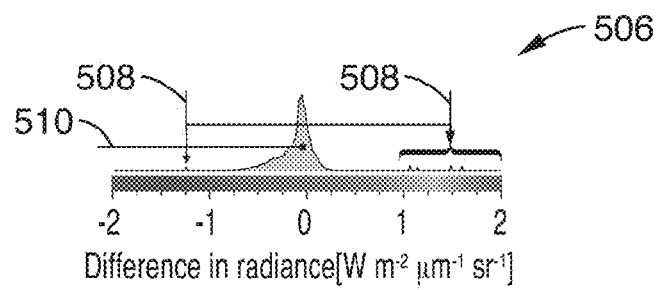
FIG. 5D is a difference histogram created by subtracting the image of FIG. 5B from FIG. 5A, indicating fire outliers outside of the non-fire data distribution.

FIG. 5D is a difference histogram 506 created by subtracting the image of FIG. 5B from FIG. 5A, indicating fire outlier pixels 508 outside of the non-fire data distribution 510.

The Cedar Fire was first reported on October 24 at 17:37, while the two day images (FIG. 5A and FIG. 5B) were captured respectively on Oct. 25, 2003 at 11:50 and Oct. 24, 2003 at 12:30 (before and after the start of the fire).

Refer now to FIG. 5C, where a smaller nearby fire 502 was detected during the night. The two images used to generate this subtracted radiance image were captured on October 23rd at 23:35 and October 24th at 22:50.

Refer now to FIG. 5D, which is a radiance histogram graph of the pixels of FIG. 5C, where it is very apparent that the fire pixels 508 fall far outside of the typical distribution 510 of the background pixels despite the large time difference between the two exposures (approximately 24 hours). In this case, the distribution of the background pixels is much narrower and thus the target fire pixels are clearly differentiated from the rest of the image.

Calculations indicate that a 12 $m^2$ fire at a temperature of 1100° K is about 100 standard deviations larger than fluctuations against Poisson noise from subtractions of images immediately preceding outbreak when compared to the solar background light in a few second exposure. It should be noted that a 12 $m^2$ fire at 1100° K has an energy output of about one megawatt.

Figure 6A:
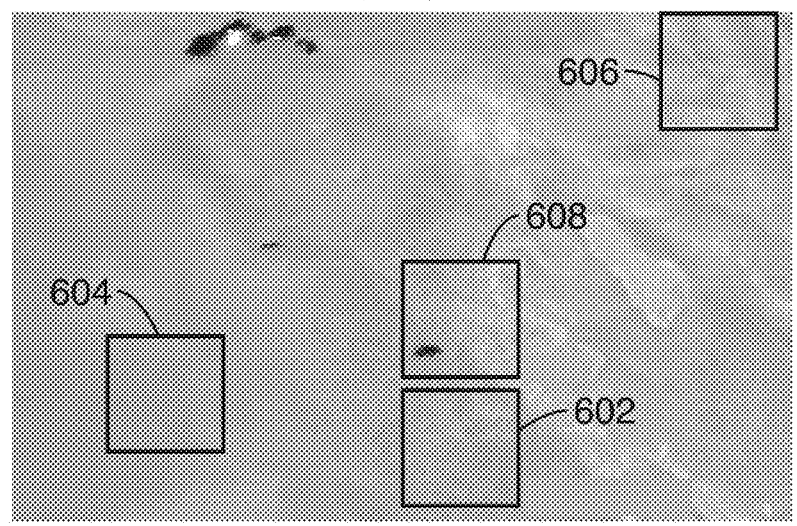
FIG. 6A is a night image of the Southern California region acquired on day 298 subtracted from the same region acquired on day 299, with particular background, desert, ocean, and fire regions indicated.
Figure 6B:
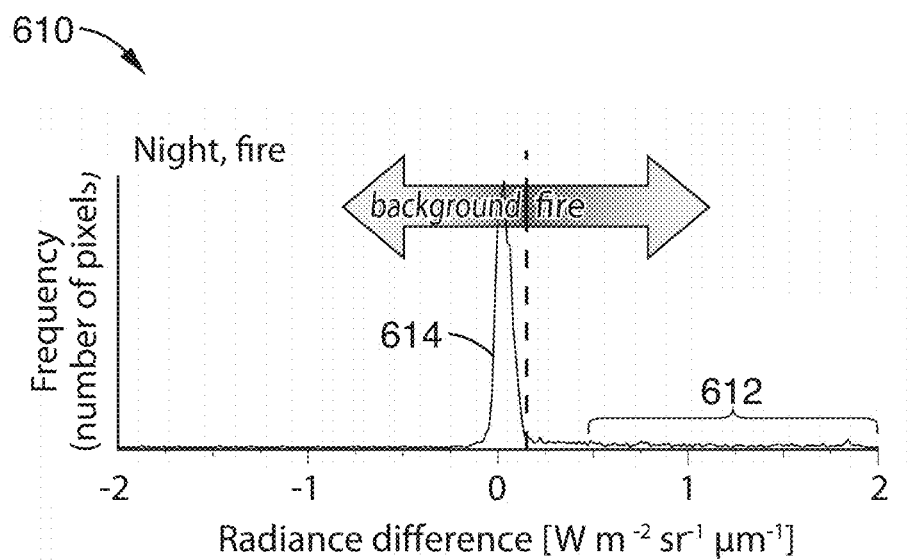
FIG. 6B is a histogram of the entire difference image of FIG. 6A, showing the frequency versus subtracted radiance, and indicating that at night, the fire outliers have higher subtracted radiance than the background.
Figure 6C:
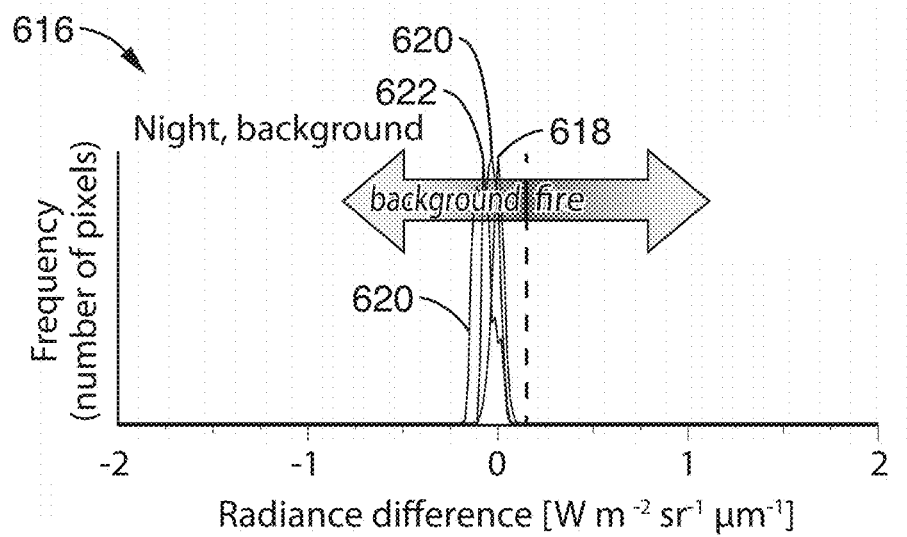

Refer now to FIG. 6A through FIG. 6C. FIG. 6A is a difference image 600 of night images of a Southern California region acquired on day 298 subtracted from the same region acquired on day 299, with particular background 602, desert 604, ocean 606, and fire 608 regions indicated.

FIG. 6B is a histogram 610 of the entire difference image of FIG. 6A, showing the frequency versus subtracted radiance, and indicating that at night, the fire outliers 612 have higher subtracted radiance than the background 614.

FIG. 6C is a histogram 616 of FIG. 6A, showing the frequency versus subtracted radiance of particular regions of FIG. 6A, and indicating that at night, the background 618, desert 620, and ocean 622 curves are nearly similar.

Figure 7A:
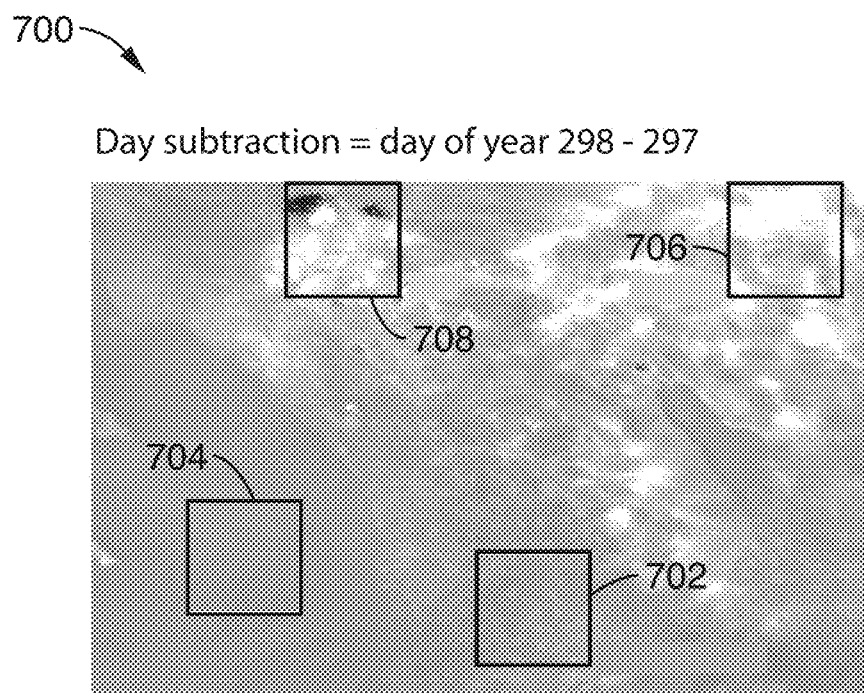
FIG. 7A is a day image of the Southern California region acquired on day 297 subtracted from the same region acquired on day 298, with particular background, desert, ocean, and fire regions indicated.

Refer now to FIG. 7A, which is a day image 700 of the Southern California region acquired on day 297 subtracted from the same region acquired on day 298, with particular background 702, desert 704, ocean 706, and fire 708 regions indicated.

Figure 7B:
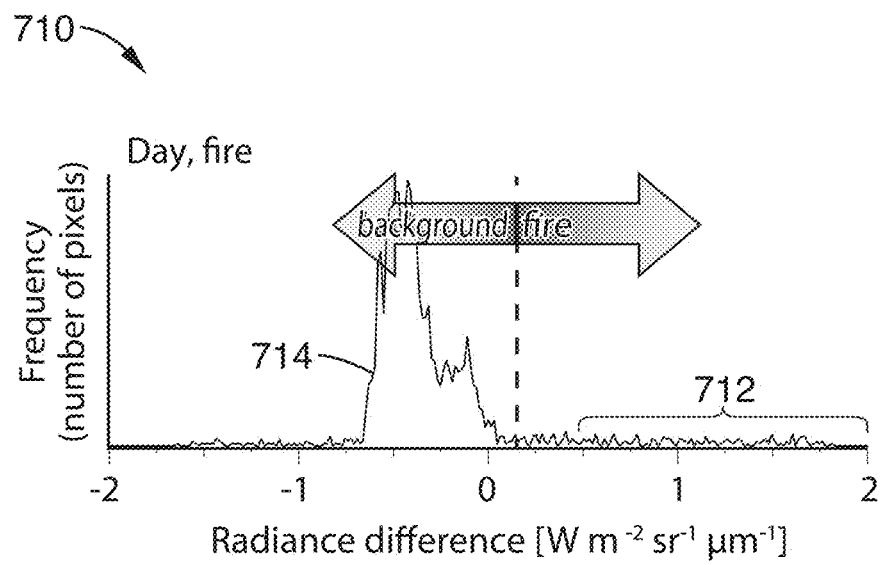
FIG. 7B is a histogram of FIG. 7A, showing the frequency versus subtracted radiance, and indicating that during the day, the fire outliers have higher subtracted radiance than the background.

FIG. 7B is a histogram 710 of FIG. 7A, showing the frequency versus subtracted radiance, and indicating that during the day, the fire outliers 712 have higher subtracted radiance than the background 714.

Figure 7C:
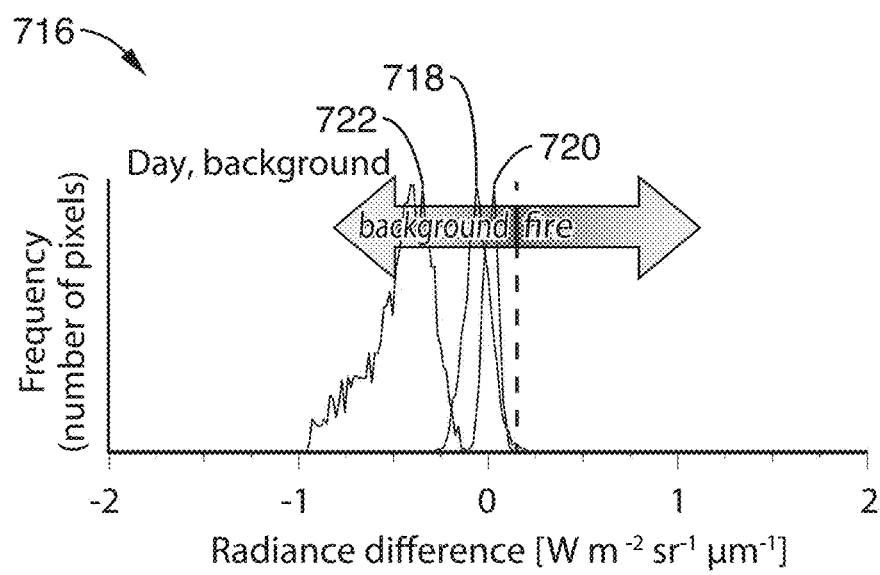
FIG. 7C is a histogram of FIG. 7A, showing the frequency versus subtracted radiance of particular regions of FIG. 7A, and indicating that during the day, the background, and ocean curves are nearly similar, but that the desert curve has significantly lower subtracted radiance.

FIG. 7C is a histogram 716 of FIG. 7A, showing the frequency versus subtracted radiance of particular regions of FIG. 7A, and indicating that during the day, the background 718 and ocean 720 curves are nearly similar, but that the desert 722 curve has significantly lower subtracted radiance.

Referring back to FIG. 6B and FIG. 7B, it is seen that the background histograms are nearly Gaussian in nature, and completely flat beyond a narrow range of residual radiance indicating nearly identical before and after images. The fire histograms (612 and 712 respectively) contain fire pixels far outside of the normal background pixel distribution (614 and 616 respectively).

Figure 8A:
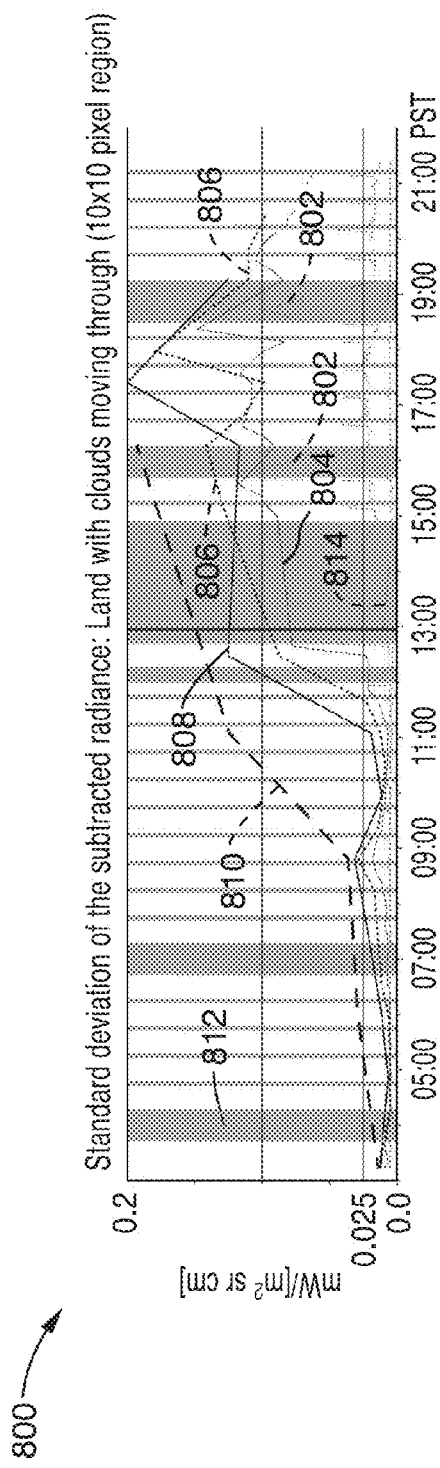
FIG. 8A is a graph of the standard deviation of subtracted radiance versus time of day for a 10×10 pixel image of land with clouds passing by on the 3.9 µm band of the GOES-14 sensor, where graphs of image acquisition time intervals are indicated.

3.2. Shorter Time Gaps between Images Reduce Standard Deviation of the Background in Subtracted Images Refer now to FIG. 8A and FIG. 8B. FIG. 8A is a graph 800 of the standard deviation of subtracted radiance versus time of day for a 10×10 pixel image of land with light clouds passing by on the 3.9 μm band of the GOES-14 sensor, where graphs of image acquisition time intervals are indicated at intervals of: 1 minute 802, 10 minute 804, 30 minute 806, 60 minute 808, and 120 minute 810. Note that during shaded time periods 812, no data was available.

Note that the graph curve of "land with clouds overhead" and "land with clear skies" refer to images where light clouds are present (as determined by visual inspection of the infrared images), and there are images where there are clear skies (no clouds visible). Land with clear skies 814 is shown for reference purposes.

Figure 8B:
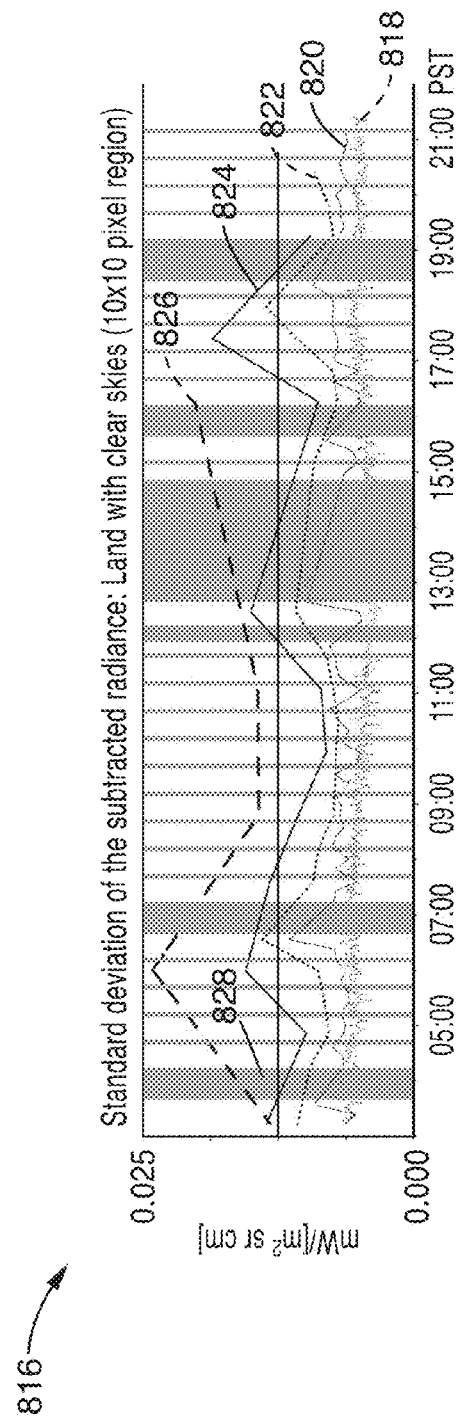
FIG. 8B is a graph of the standard deviation of subtracted radiance versus time of day for a 10×10 pixel image of land with clear sky on the 3.9 µm band of the GOES-14 sensor, where graphs of image acquisition time intervals are indicated.

FIG. 8B is a graph 816 of the standard deviation of subtracted radiance versus time of day for a 10×10 pixel image of land with clear sky on the 3.9 μm band of the GOES-14 sensor, where graphs of image acquisition time intervals are indicated at intervals of: 1 minute 818, 10 minute 820, 30 minute 822, 60 minute 824, and 120 minute 826. Note that during shaded time periods 828, no data was available. The term "clear sky" is generally taken to means no large big clouds or even cirrus clouds, and certainly no cumulonimbus clouds.

GOES imagery was used to test whether background in subtraction images could be effectively eliminated by decreasing the time differential between image acquisitions. The temporal frequency of the GOES imager can be programmed to a special schedule known as Super Rapid Scan Operation (SRSO), during which an area of about 1500 by 1500 km is scanned every minute. Band 2 (3.9 μm) of the SRSO data collected by GOES-14 was analyzed to study how the temporal frequency affects image subtraction, and in particular, how it affects the non-fire background pixels.

In total, 714 images were analyzed that span approximately 19 hours of the day: from 03:14 to 21:26 Pacific Standard Time. By eliminating a subset of these images, a temporal resolution of 10, 30, 60, and 120 minutes were simulated.

Both FIG. 8A and FIG. 8B show subtracted standard deviations of two 10×10 pixel regions of land extracted from 3.9 μm band of the GOES-14 sensor: one region with clouds moving across (FIG. 8A), and another with clear skies (FIG. 8B) representing worst-case and ideal scenarios, respectively. In both cases, the standard deviation of residuals is reduced as the time interval between the subtracted images decreases (from 120 minutes to 1 minute).

The standard deviations of the background in the subtracted images were two to three times larger for the longer gap images, especially in areas where there was cloud movement (as seen in FIG. 8A). Image subtractions captured at a faster frequency were less affected by the radiance variation throughout the day: the subtracted radiance at 12:00 is nearly the same as that at 05:00 and 21:00.

Figure 9A:
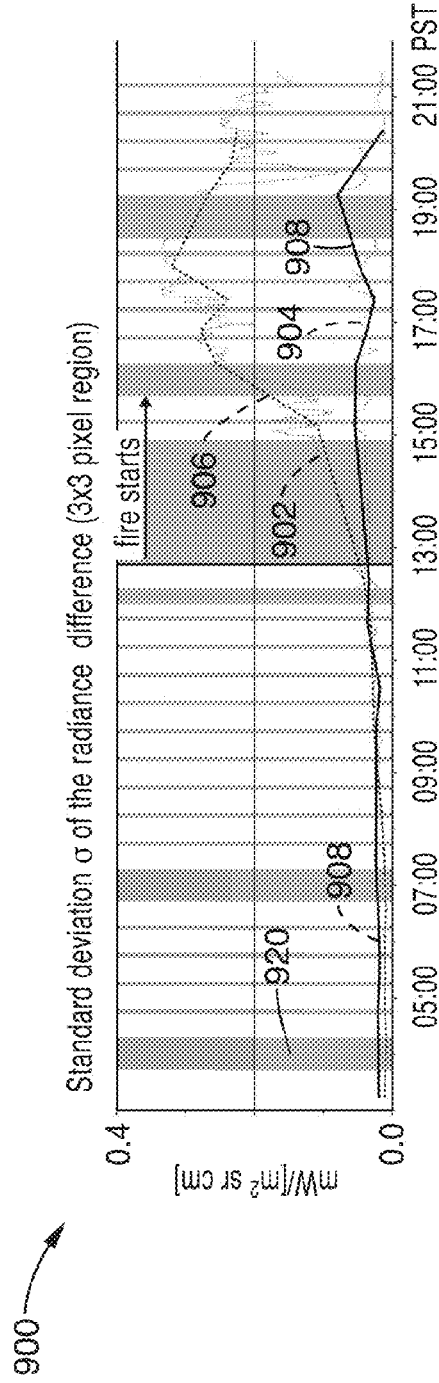
FIG. 9A is a graph of the standard deviation of the image radiance versus time of day for a 3×3 pixel image on the 3.9 µm band of the GOES-14 sensor on Sep. 21, 2012 in SRSO mode, where graphs of the fire and non-fire pixels are shown for acquisition time intervals of 1 minute and 30 minutes.
Figure 9B:
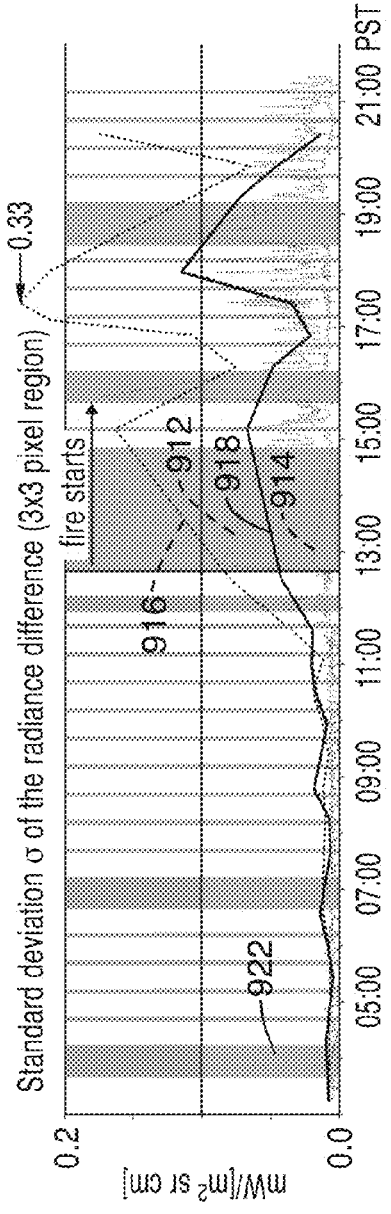
FIG. 9B is a graph of the standard deviation of subtracted radiance versus time of day for a 3×3 pixel image of land with clear sky on the 3.9 µm band of the GOES-14 sensor on Sep. 21, 2012 in SRSO mode, where graphs of the fire and non-fire pixels are shown for acquisition time intervals of 1 minute and 30 minutes.

Refer now to FIG. 9A and FIG. 9B. FIG. 9A is a graph of the standard deviation 900 of the image radiance versus time of day for a 3×3 pixel image on the 3.9 μm band of the GOES-14 sensor on Sep. 21, 2012 in SRSO mode, where graphs of the fire and non-fire pixels are shown for acquisition time intervals of 1 minute and 30 minutes.

FIG. 9B is a graph of the standard deviation 910 of subtracted radiance versus time of day for a 3×3 pixel image of land with clear sky on the 3.9 μm band of the GOES-14 sensor on Sep. 21, 2012 in SRSO mode, where graphs of the fire and non-fire pixels are shown for acquisition time intervals of 1 minute and 30 minutes.

In FIG. 9A, the graph 900 shows fire pixels with a 1 minute sampling interval 902, non-fire pixels with a 1 minute sampling interval 904, fire pixels with a 30 minute sampling interval 906, and finally non-fire pixels with a 30 minute sampling interval 908. The fire appears to start shortly before 1300 hours.

Similarly, in FIG. 9B, the graph 910 shows fire pixels with a 1 minute sampling interval 912, non-fire pixels with a 1 minute sampling interval 914, fire pixels with a 30 minute sampling interval 916, and finally non-fire pixels with a 30 minute sampling interval 918. The fire appears to start shortly before 1300 hours.

In both FIG. 9A and FIG. 9B, there are intervals where no data (920 and 922 respectively) were available.

The standard deviations of FIG. 9A and FIG. 9B were calculated for two small (3×3 pixel) regions: one directly over a fire (902 and 906 of FIG. 9A, 912 and 916 of FIG. 9B) and another immediately adjacent with no fire (904 and 908 of FIG. 9A, and 914 and 918 of FIG. 9B).

The subtracted and raw radiance of both fire and non-fire regions are observed to be nearly identical until the fire started between 12:45 and 14:53 PST, at which time the subtracted radiance standard deviation of the fire pixels is over 10 times higher than that of the non-fire pixels.

Further, once a fire started within the scene, the subtracted radiance was easily discernable from adjacent non-fire pixels (see 902 and 906 of FIG. 9A, and 916 of FIG. 9B), not only because of the fire signal's significantly higher variability, but also because the fire signal was over ten times the magnitude of the non-fire pixels. These points indicate that rapid scanning, as designed in FUEGO, will help to separate the target fire pixels from the background.

3.3. Reduction of False Alarms with Optimal Image Subtractions "OIS"

If point spread function (PSF) changes are seen in observed images, it is planned to test the modified Alard-Lupton algorithm developed by Miller, Hartung, and Pennypacker to undertake optimal subtractions, where artifacts from optical misalignments, for example, could be made smaller. These methods have been developed for optical astronomy, and work well in crowded fields.

Figure 10C:
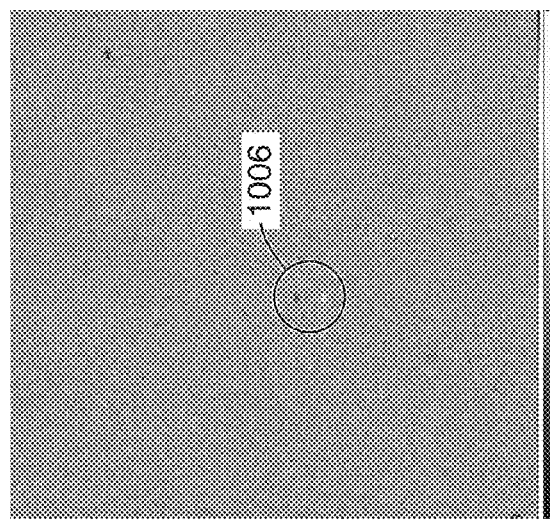
FIG. 10C is an image of the subtraction of FIG. 10A from FIG. 10B, with a reasonably small number of artifacts resulting from the subtraction.
Figure 10B:
FIG. 10B is a newer image of the section of sky of FIG. 10A.
Figure 10A:
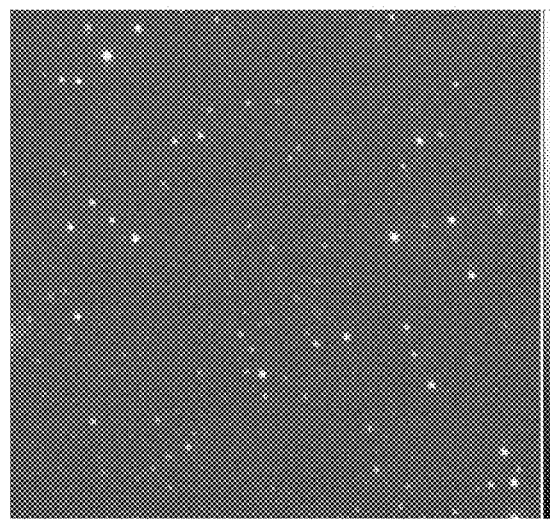
FIG. 10A is a reference image of a section of sky.

Refer now to FIG. 10A through FIG. 10C. FIG. 10A is a reference astronomical image 1000 of a section of sky. FIG. 10B is a newer image 1002 of the section of sky of FIG. 10A. FIG. 10C is an image of the subtraction 1004 of FIG. 10A 1000 from FIG. 10B 1002, with a reasonably small number of artifacts resulting from the subtraction.

In FIG. 10C, an asteroid 1006 is observed that moves between the FIG. 10A and FIG. 10B images. This asteroid 1006 becomes apparent in the subtraction on the FIG. 10A from the FIG. 10B images above. This asteroid 1006 is at the center of FIG. 10C as a dark object and then a neighboring bright object below.

4. Opportunities for FUEGO Instrumentation and Computing

It has only been within the past several years that large, fast arrays of infrared detectors have become available. Such devices can now be as large as 4,000×4,000 pixels, which means a mosaic of such detectors can view significant portions of the United States in a single image. Readout rates for existing 2,000×2,000 HgCdTel detectors can be as short as 8 milliseconds, so pixels will not saturate on the solar background at noon when using these arrays.

If it is assumed that pixels view 100 m on a side (somewhat oversampling the PSF at 4 microns), then a 4,000×4,000 detector can survey a 400 km by 400 km area in five seconds (including multiple exposures and repointing time—almost certainly with a servo-controlled mirror). If such a satellite were surveying a region comparable to the Western United states with successive images, it could cover a 2,000 km×2,000 km region of interest in about two minutes. A possible NOAA satellite, to be deployed upon success of a potential Pathfinder mission, could have a larger array, and have proportionately shorter image sampling intervals.

During periods of intense fire danger, such as in California when the Santa Anna winds are active, certain areas could be imaged more frequently, to decrease the sampling interval, and hence, the detection time.

Another possible barrier to the development of a real-time fire detection sensor is the large number of computations that must be executed to rule out false positives, and to perform rapid comparisons between new images (with a fire) and old images (without a fire).

The previously mentioned Allard-Lupton Algorithm can involve up to 100 arithmetic operations per pixel. Therefore, a 4,000×4,000 pixel detector with 0.001 second exposures would require a computer to undertake approximately $10^{12}$ calculations per second with optimal image subtraction (OIS), which exceeds all but super computers. However, flight-proven Field Programmable Gate Array (FPGA) devices have been flown that can reach this performance level.

Tests with 2,000 core graphical processing units (GPUs) and cheap commercially available boards have already achieved an arithmetic processing rate of $3\times10^{12}$ calculations per second (3 teraflops) with optical image stabilization (OIS) already. It would be expected that in the five years or until a FUEGO launch, such calculation rates could be significantly improved, and would not appear to be an obstacle.

Certainly, if the 1991 Oakland fire could have been seen long before it went critical, a billion dollars of housing infrastructure in the United States San Francisco Bay Area might have been saved.

5. Preliminary FUEGO Satellite Design Concepts

Figure 11:
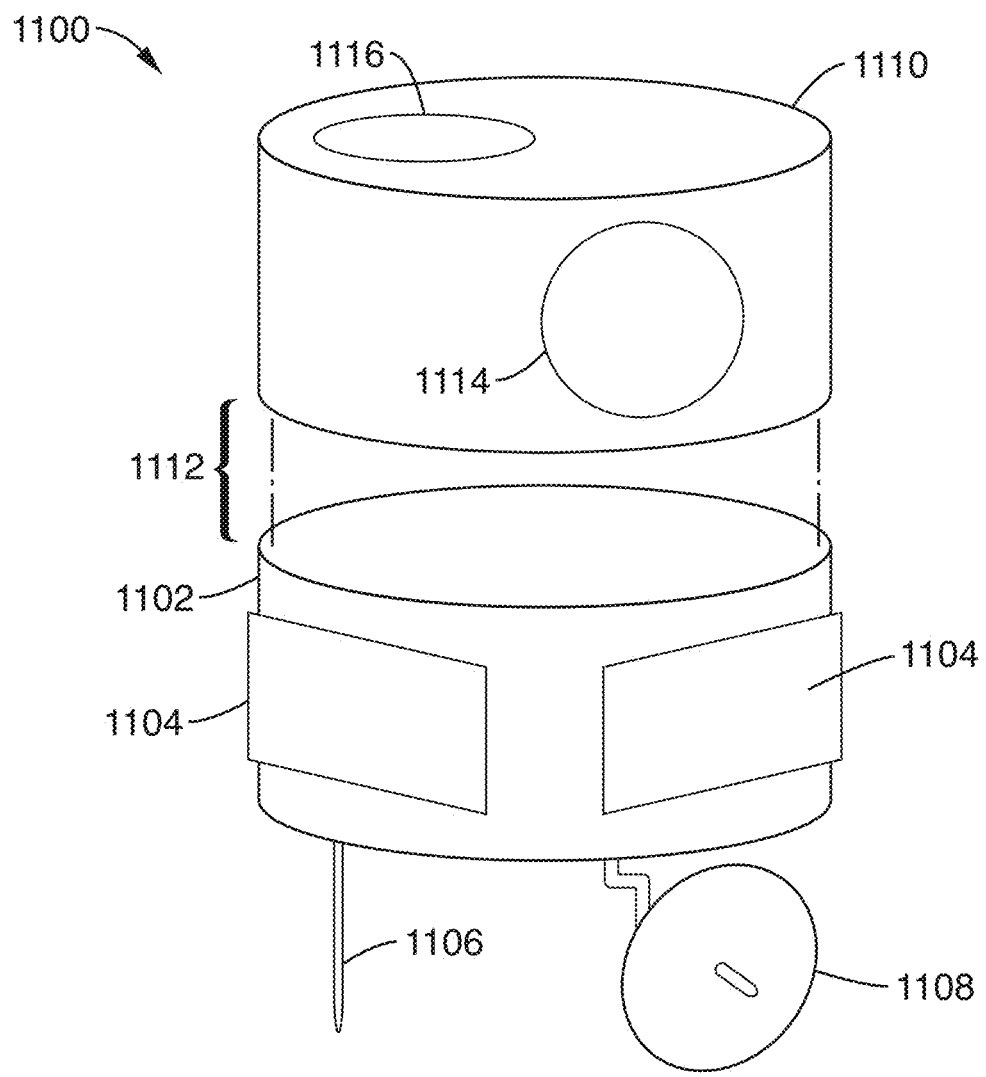
FIG. 11 is a perspective view of a conceptual layout of the FUEGO satellite, with major components indicated.

Refer now to FIG. 11, which is a perspective view 1100 of a conceptual layout of the FUEGO satellite, with major components indicated. Here, a spacecraft bus 1102 has one or more solar panels 1104 arranged to supply power to the spacecraft bus 1102. S band 1106 and K band 1108 antennae are available for ground to spacecraft bus 1102 communication. FUEGO 1110 would be connected 1112 to the spacecraft bus 1102 as the conceptual payload with a baffled optical aperture 1114, which baffles would be cooled by a sensor heat dump 1116 located on the FUEGO 1110 North face.

The previous discussion relates mainly to the overview of the fire detection system. A detailed explanation of how the fire detection system operates now follows.

6. Overall Fire Detection Algorithm

Figure 12:
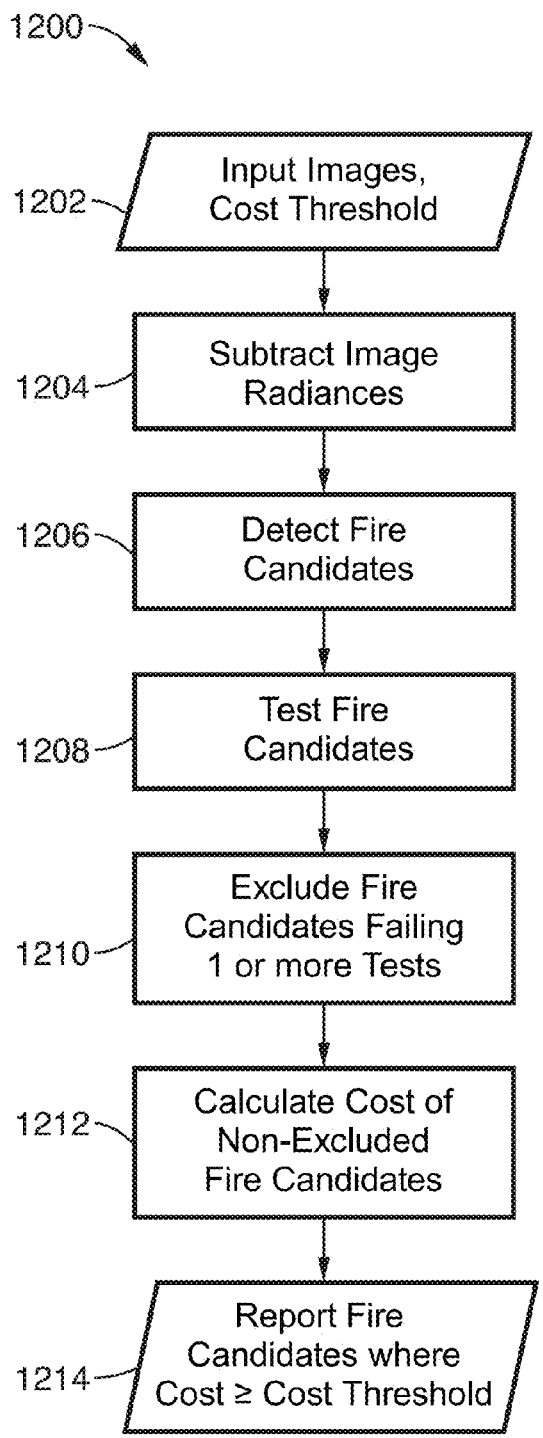
FIG. 12 is a flowchart of the major software elements of the fire detector apparatus described herein.

Refer now to FIG. 12, which is a flowchart 1200 of how a fire detection system as described here might work. Initially, input images and a cost threshold are input 1202. Next, certain input images are subtracted from each other 1204 to form a subtracted difference radiance image, which is processed to detect 1206 pixels that are fire candidates. A fire candidate means that such a pixel may well represent a potential fire.

Once the set of fire candidates have been generated, a set of tests are conducted on the fire candidates 1208 to determine whether or not it is likely that a fire is actually present. Fire candidates that fail one or more tests are typically omitted 1210 from a resulting list of non-excluded fire candidates.

A cost calculation of the non-excluded fire candidates that remain 1212 is then undertaken. For instance, a fast moving fire near an urban area growing quickly would have a much higher cost than a smoldering fire in a remote area with little or no fuel in its projected path. Such a latter fire may well be completely ignored.

Finally, fires that have been evaluated with a cost equal to or exceeding an input cost threshold would be reported 1214 to a fire management system.

6.1 Input Images

Two or more input images are made by the imager at one or more wavelengths. These input images are separated by some sampling interval, which may be used to parse an incoming image stream, or to select other images, as needed. Some of these other images may be related images of the same geographic region, but taken at a different wavelength when a multispectral imager is being used, or when multiple imagers are being used with different operating wavelengths.

The input images 1202 may be dithered to increase their accuracy, decrease quantization errors, and to reduce large-scale noise that may otherwise be present in the images. Unlike astronomical dithering, this dithering is with respect to images that are made of the surface over the same geographic area or region.

After the images are input, or otherwise made available (for instance historical images stored in memory or other storage device), those images that are spaced apart by a sampling interval are subtracted 1204. Here, the older image subtracted from the newer image, which tends to produce a result that shows how a potential fire is progressing, rather than its history. The result is a subtracted difference radiance image. While this is referred to as an image, and may certainly be viewed as an image, it is more aptly described as an array stored in a processor.

The input images 1202 are typically at some wavelength of IR that tends to minimize effects of smoke or water vapor. There may be several images that are taken at different wavelengths in a multispectral imager. For instance, images taken at 4.05 μm (mid-wave IR) wavelengths tend to mitigate the effects of smoke that would otherwise tend to obscure a fire.

6.2 Fire Candidate Detection

Figure 13:
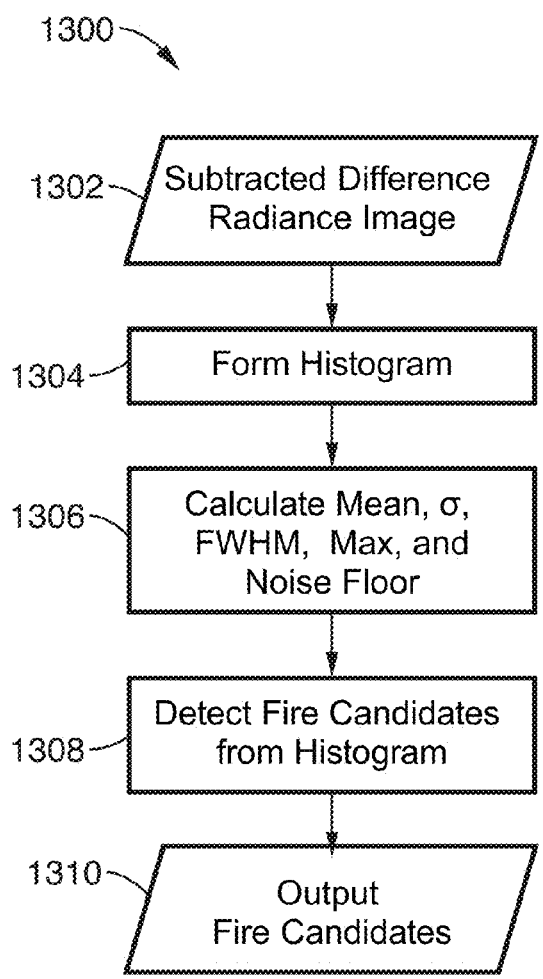
FIG. 13 is a flowchart of the major software elements used for fire candidate detection.

Refer now to FIG. 13, which is a flow chart 1300 of how the initial fire candidate pixels are created. Initially, the subtracted difference radiance image is input 1302, from which a histogram is created 1304. This histogram is actually a subtracted difference radiance histogram.

From the histogram, calculations are made 1306 to determine various statistics, which may include the mean, maximum value, standard deviation ($\sigma$), and the full width half maximum (FWHM) value.

Briefly referring back to FIG. 5D, FIG. 6B, FIG. 6C, FIG. 7B, and FIG. 7C it is seen that the resulting histograms are characterized as having a major background signal (for instance the non-fire data distribution 510 of FIG. 5D), from which outlier pixels (see 508 in FIG. 5D) may be detected.

Referring back to FIG. 13, the outlier pixels in the histogram are typically characterized as having radiance values that are statistically significant above the calculated noise floor. Outlier pixels that have radiance values above the non-fire distribution (see 510 of FIG. 5D) are then deemed to be fire candidates. This entire process is alternatively known as detecting fire candidates from the histogram 1308, more simply as fire candidate detection, or means for detecting fire candidates.

After the fire candidates have been detected, they are output from this routine 1310.

6.3 Fire Candidate Tests

Figure 14:
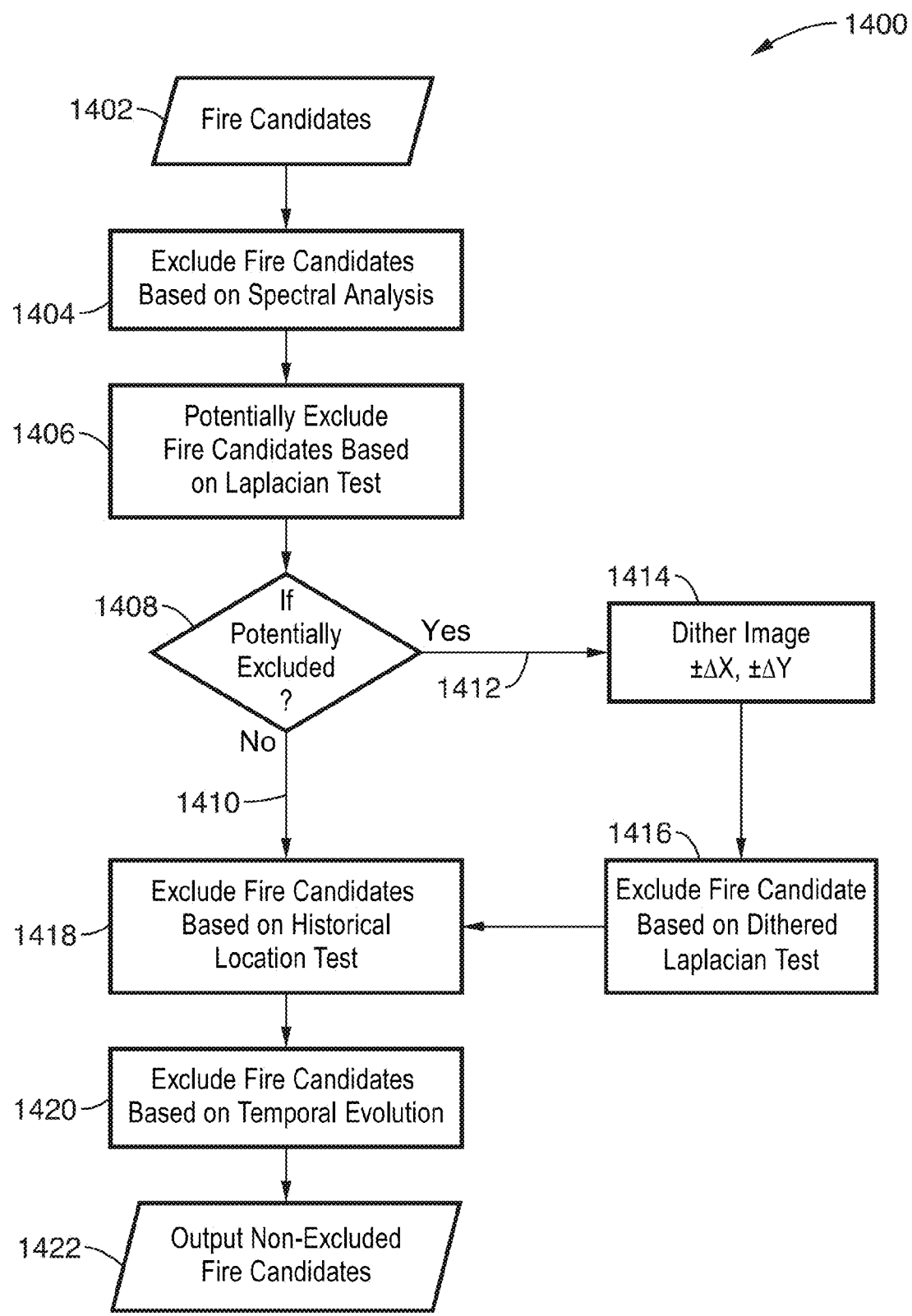
FIG. 14 is a flowchart of the major software elements used for fire candidate exclusion.

Refer now to FIG. 14, which is a flowchart 1400 of tests that may be used to exclude the input fire candidates 1402 that may actually be sun glints or other artifacts that are not actual fires.

6.3.1 Exclude Fire Candidates Based on Spectral Analysis

A valid fire is typically characterized by having a ratio $$\frac{f_{IR}}{f_{vis}} > \varepsilon$$

of IR radiant flux ($f_{IR}$) in the mid- or longer-wave IR bands divided by a radiant flux in the visible or shorter bands ($f_{vis}$) being greater than some value 0.7 (the 0.7 value may vary with fuel source, specific locale, and future experience with FUEGO fire detection). Therefore, fire candidates with $$\frac{f_{IR}}{f_{vis}} \le \varepsilon$$

would be excluded from the fire candidate list. This overall spectral analysis may be referred to as "Exclude Fire Candidates Based on Spectral Analysis" 1404.

Reflections of sunlight always have a ratio $$\frac{f_{IR}}{f_{vis}}$$

greater than about 10, when compared to typical blackbody radiation. Most fires tend to be best modeled as blackbody radiators having a temperature of around 1200° K.

6.3.2 Exclude Fire Candidates Based on Laplacian Test

An early fire (characterized by a single pixel true point source fire candidate), when compared with neighboring pixels should exceed some value. This is the so called "Laplacian Test" since the two dimensional Laplace operator is proportional to the difference of intensities I(center)–(⅛)*Sum(all eight surrounding pixels), and operates to detect a spatial location that is starting to be anomalous from its neighbors. Here, if the fire candidate has a 0 result from the Laplacian Test, then the fire pixel is merely an average of the surrounding pixels, and therefore is not significant as a possible fire. For this reason, such a fire candidate would be excluded.

A fire candidate 1402 with a corresponding Laplacian Test result statistically higher than the surrounding pixels would be of significance as a potential fire. Alternatively, a statistically insignificant Laplacian Test result would result in exclusion of the corresponding fire candidate. This overall test is known as the "Laplacian Test" 1406.

A further refinement of the "Laplacian Test" 1406 may include dithering the camera image if the fire candidate is potentially excluded 1408. If the fire candidate is not potentially excluded 1410, then the program proceeds without the dithering operations (described below) taking place. If however, the fire candidate is potentially excluded 1412 then the image is dithered 1414 in one or more sub-pixel offsets.

The dithered resampling may be done in either direction, horizontally or vertically, as indicated by $\pm \Delta X$ and $\pm \Delta Y$. One or more resamplings may be done to generate the dithered image results 1414. If, after resampling the corresponding geographic location offset by a fraction of a pixel, the same signal results, then it is more likely that the fire candidate is valid. If the fire candidate magnitude becomes statistically insignificant, then such a fire candidate would tend to be more likely excluded as some artifact of image acquisition or processing.

The results of these dithered images 1414 are then tested (with the same Laplacian Test 1416 used on the original fire candidate) to determine if one or more of the dithered images 1414 should be excluded from the fire candidate list.

Based on the results of the dithered fire candidate Laplacian Test 1416, the original fire candidate may be excluded from the fire candidates 1416 as an excluded fire candidate.

6.3.3 Exclude Fire Candidates Based on Historical Location Test

In the Historical Location Test 1418, the previous history of ground signal corresponding to the fire candidate is examined. This may be a single pixel event that has radiations in one or more bands that tend to emit in such a way that it is unlikely to be a valid fire. For instance, if the multispectral images relating to the particular geographic surface location detect that the equivalent blackbody radiation temperature of the fire candidate would be several hundred degrees K from the average 1200° K fire, then it would be unlikely that the particular fire candidate would be valid. If this has historically happened many times, then the fire candidate would be excluded based on the Historical Location Test 1418.

6.3.4 Exclude Fire Candidates Based on Temporal Evolution Test

Here, the temporal evolution of the fire candidate is tested. For instance, a fire candidate that has been a single pixel event for the past several hours is unlikely to be a true fire, as this is not the nature of fires. Fires either grow or go out, except for contained man-made sources (for example refinery outgas burns).

Additionally, the historical behavior of adjacent geometry pixel locations may also be used to heuristically test whether the fire candidate is valid or not. If the past history indicates that there is no growth to the fire candidate, then there can be no "valid" fire in the sense that the fire has not grown (again, the refinery outgas burn is an example).

If there is no indication of growth or decrease in magnitude of emissive flux for the fire candidate, then it would likely be excluded from the fire candidate list as having failed the "Temporal Evolution Test" 1420.

6.3.5 Exclude Fire Candidates Multiple Test Results

As has been previously discussed in sections 6.3.1-6.3.4, there are multiple tests that may be applied to potentially exclude a fire candidate pixel. These preceding sections have been discussed simply from the standpoint of a single test failure excluding the fire candidate. However, at the cost of a little more complexity, the results of the previous tests may be cast into an exclusion likelihood number. In a final test, after all the preceding tests have been completed, the exclusion likelihood number would operate to exclude those fire candidates that were above some exclusion likelihood threshold. This may be shown in flowchart form as element 1210 of FIG. 12, where fire candidates are excluded when failing one or more tests.

6.3.6 Exclude Fire Candidates Return

After the above tests are completed, the non-excluded fire candidates are output 1422. These remaining fire candidates are very likely true fires that may have an important impact.

6.4 Fire Candidate Cost

At this point, each remaining fire candidate has been tested many times to determine whether it is an artifact, insignificant, contained, or otherwise not of interest. What remains of the fire candidates at this point that have not been excluded would be treated as an actual fire.

Refer back to FIG. 12. Each fire (corresponding to a non-excluded fire candidate) is examined, likely with a numerical cost associated with them in the sense of a cost function usually used in an optimization type problem 1212.

Factors that may be included in the cost function may include one or more of: 1) fire location; 2) fire direction; 3) fire speed; 4) fire fuel in the direction of growth; 5) population locations proximal to the fire; 6) infrastructure location and value proximal to the fire; 7) projected costs of fighting such a fire with available firefighting resources; 8) expected human loss of life; 9) expected loss of endangered habitat; 10) expected loss of endangered species; 11) need for controlled burn in the projected path of the fire; 12) projected temperatures in the projected path of the fire; 13) projected humidity in the projected path of the fire; and 14) projected future costs of firefighting if not previously fought.

The result of the cost function is a number, which is the numerical cost of a fire. When a fire cost exceeds an input cost threshold, that particular fire is output to the appropriate firefighting organization, or at the very least to the ground based receiver of the fire output.

7. Sample Computer Code

Appendix A includes an example of computer programming that implements image subtraction, histogram preparation from the image subtraction, and some statistical analysis of the histogram that would be useful for a complete implementation of a FUEGO fire detection system.

8. Conclusions

It is reasonable that a small geosynchronous satellite (or an unmanned aerial vehicle "UAV") with modern detectors and computing power as described here holds the potential for robust notification and management of fires. The tremendous progress in HgCdTel imagers, coupled with advances in high-speed computing enables a satellite with enough capability that the fire signal could likely be discriminated against an expected large number of systematic noise events.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic.

As will be appreciated, any such computer program instructions may be loaded onto a computer, including without limitation a general purpose computer or special purpose computer, or other programmable processing apparatus to produce a machine, such that the computer program instructions that execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems that perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means that implement the function specified in the block(s) of the flowchart(s).

The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" and "programming executable" as used herein refers to one or more instructions that can be executed by a processor to perform a function as described herein. The programming can be embodied in software, in firmware, or in a combination of software and firmware. The programming can be stored locally to the device in non-transitory media, or can be stored remotely such as on a server or all or a portion of the programming can be stored locally and remotely. Programming stored remotely can be downloaded (pushed) to the device by user initiation, or automatically based on one or more factors, such as, for example, location, a timing event, detection of an object, detection of a facial expression, detection of location, detection of a change in location, or other factors. It will further be appreciated that as used herein, that the terms processor, graphical processing unit (GPU), central processing unit (CPU), and computer are used synonymously to denote a device capable of executing the programming and communication with input/output interfaces and/or peripheral devices.

From the discussion above it will be appreciated that our technology can be embodied in various ways, including but not limited to the following:

1. An apparatus for fire urgency estimation, the apparatus comprising: (a) a satellite configured to be disposed in Earth orbit; (b) the satellite comprising an imager configured to capture a plurality of images; (c) a processor configured for processing the images; and (d) programming executable on the processor for detecting a fire location across extensive geographic regions while suppressing false fire alarms by performing steps comprising: (i) classifying trends in response to temporal subtraction of images received by the multispectral imager over a time of seconds to minutes; (ii) dithering of the images to improve resolution; (iii) adjusting detection thresholds in a time-sensitive autonomous manner to reduce false alarm rates despite constantly varying conditions; and (iv) generating calibrated decisions regarding fire urgency in response to the classifying, dithering, and adjusting steps.

2. The apparatus of any preceding embodiment, wherein the apparatus provides a quantitative measure of intensity and rate of growth of fires detected within a field of view of the imager.

3. The apparatus of any preceding embodiment, wherein the images comprise multispectral images.

4. The apparatus of any preceding embodiment, wherein the imager comprises a multispectral imager.

5. The apparatus of any preceding embodiment, wherein the programming performs the classifying of trends in response to a key ratio of an observed signal from a fire seen in the images divided by an amount of signal generated from midday Earth.

6. The apparatus of any preceding embodiment, wherein the programming determines the key ratio in response to: (a) an aperture of the imager as determiner of its light gathering power and diffraction pattern diameter; (b) a waveband in which the images are captured; and (c) an imager finesse with which the images are pixelated; (d) wherein imager finesse is a remote sensing requirement to recover information in the images relating sample size to a diffraction pattern diameter of the imager.

7. The apparatus of any preceding embodiment, wherein the programming requires a level of imager finesse whereby at least two pixels from the image are detected across the diffraction pattern diameter of the imager.

8. The apparatus of any preceding embodiment, wherein the programming performs the classifying of trends in response to signal-to-noise calculations of the images.

9. The apparatus of any preceding embodiment, wherein the processor is selected from a group of processors consisting of: (a) a processor located on Earth; (b) a processor located in Earth orbit; (c) a processor located in the satellite; and (d) a distributed processor comprising some processing occurring in Earth orbit and some processing occurring on Earth.

10. The apparatus of any preceding embodiment, wherein the programming performs the classifying of trends in response to utilizing: (a) matched filters, or (b) successive least-square fittings of candidate fires to expected fire signatures, or a combination of (a) and (b).

11. The apparatus of any preceding embodiment, wherein the programming further performs steps comprising: (a) detecting one or more candidate fires; and (b) evolving each candidate fire from the images into comparisons against adjacent pixels, in response to multiple time intervals between the images.

12. The apparatus of any preceding embodiment, wherein the adjacent pixels comprise: (a) spatially adjacent pixels; or (b) temporally adjacent pixels.

13. The apparatus of any preceding embodiment, wherein the adjacent pixels are selected from a group of numbers of pixels consisting of: 2-10, 10-30, 30-100, 100-200, 200-400, 100-300, and 300-1000 pixels.

14. The apparatus of any preceding embodiment, wherein the programming makes the calibrated decisions regarding fire urgency in response to: (1) an estimated probability that an early detection event will become a fire, (2) a potential impact of a fire on lives and property loss at a given location, time, or combination of location and time, and (3) an ability to generate early outbreak warnings to responders of a fire.

15. The apparatus of any preceding embodiment, wherein the apparatus is configured for detecting fires on the order of their first minute after a fire outbreak.

16. The apparatus of any preceding embodiment, wherein the imager is configured for detecting fires even when they cover less than 10 m$^2$.

17. The apparatus of any preceding embodiment, wherein the imager is configured with sufficient sensitivity to detect fires having on the order of one megawatt of energy output.

18. The apparatus of any preceding embodiment, wherein the extensive geographic regions comprise areas of one or more states, or regions of large states.

19. The apparatus of any preceding embodiment, wherein the satellite is configured for deployment in geosynchronous orbit.

20. The apparatus of any preceding embodiment, wherein the imager provides detection that includes near-infrared, mid-infrared, or both near- and mid-infrared bands.

21. The apparatus of any preceding embodiment, wherein the imager comprises a Mercury-Cadmium-Telluride (HgCdTel) imager.

22. The apparatus recited in any preceding embodiment, further comprising satellite navigation and control systems that provide accurate orientation and replicability during acquisition of images by the imager.

23. An apparatus for fire urgency estimation, the apparatus comprising: (a) an imager configured for capturing images, wherein said imager is configured for deployment within a satellite configured for orbiting Earth; (b) a processor configured for processing said images; and (c) programming executable on said processor for detecting fire locations across extensive geographic regions while suppressing false alarms by performing steps comprising: (i) classifying trends in response to temporal subtraction of images received by said imager over a time of seconds to minutes; (ii) dithering of images to improve resolution; (iii) adjusting detection thresholds in a time-sensitive autonomous manner to reduce false alarm rates despite constantly varying conditions; and (iv) generating calibrated decisions regarding fire urgency in response to steps (i) through (iii).

24. A method of fire urgency estimation for detecting fire locations across extensive geographic regions while suppressing false alarms, the method comprising: (a) classifying trends in response to temporal subtraction of images received by an imager over a time of seconds to minutes, wherein said images are captured by the imager integrated within a satellite orbiting Earth; (b) dithering of said images to improve resolution; (c) adjusting detection thresholds in a time-sensitive autonomous manner to reduce false alarm rates despite varying environmental conditions; and (d) generating calibrated decisions regarding fire urgency in response to steps (a) through (c).

25. A fire urgency estimator, comprising: (a) a platform comprising an imager configured to capture a plurality of Earth geographic images; (b) programming executable on the platform capable of performing steps comprising: (i) subtracting one Earth geographic image from another Earth geographic image; (A) wherein the two images are separated by a sampling interval to form a radiance difference image; and (B) wherein the two images view at least a portion of the same Earth geography; (ii) detecting candidate fires in the radiance difference image within the same Earth geography; (iii) excluding from the candidate fires those that fail one or more tests to form a set of non-excluded candidate fires; (iv) evaluating an importance cost of the non-excluded candidate fires; and (v) reporting the non-excluded candidate fires above a fire importance cost reporting threshold.

26. The fire urgency estimator of any preceding embodiment, wherein the platform comprises either: (a) a satellite in Earth orbit; or (b) a manned aerial vehicle; or (c) an unmanned aerial vehicle (UAV).

27. The fire urgency estimator of any preceding embodiment, wherein the platform further comprises: (a) a processor physically disposed proximally to the platform; or (b) a ground based processor; or (c) a distributed processor comprising: (i) a processor physically disposed within or proximal to the platform; and (ii) a ground based processor in communication with the processor physically disposed proximally to the platform; (iii) wherein processing takes place in both the platform processor and in the ground based processor; and (iv) wherein the platform processor and the ground based processor are in at least periodic communication.

28. The fire urgency estimator of any preceding embodiment, wherein the imager comprises either a monospectral or multispectral imager.

29. The fire urgency estimator of any preceding embodiment, wherein the imager comprises an ability to produce dithered geographic images.

30. The fire urgency estimator of any preceding embodiment, wherein said detecting candidate fires comprises: (a) forming a histogram of the radiance difference image; and (b) calculating one or more properties from the histogram, wherein the one or more properties are selected from a group of properties consisting of: a mean, a maximum value, a standard deviation ($\sigma$), and a full width half maximum (FWHM) value.

31. The fire urgency estimator of any preceding embodiment, wherein the step of detecting candidate fires further comprises detecting one or more fire candidates from the histogram.

32. The fire urgency estimator of any preceding embodiment, further comprising: (a) a fire urgency receiver; (b) wherein the receiver is configured to receive from the platform at least one of the reported non-excluded candidate fires above the fire importance cost reporting threshold; and (c) wherein the receiver is configured to receive from the platform a geographic location corresponding to at least one reported non-excluded candidate fire.

33. A fire urgency estimator, comprising: (a) a computer processor; and (b) programming in a non-transitory computer readable medium and executable on the computer processor for performing steps comprising: (i) capturing a plurality of Earth geographic images by using an imager; (ii) subtracting one Earth geographic image from another Earth geographic image; (A) wherein the two images are separated by a sampling interval to form a radiance difference image; and (B) wherein the two images view at least a portion of the same Earth geography; (iii) detecting candidate fires in the radiance difference image within the same Earth geography; (iv) excluding from the candidate fires those that fail one or more tests to form a set of non-excluded candidate fires; (v) evaluating an importance cost of the non-excluded candidate fires; and (vi) reporting the non-excluded candidate fires above a fire importance cost reporting threshold.

34. A computer readable non-transitory storage medium comprising software configured to be run by at least one computer processor for performing steps comprising: (a) providing a radiance difference image by performing steps comprising: (i) acquiring at least two Earth geographic images; (ii) subtracting one Earth geographic image from another Earth geographic image to form the subtracted difference image; (iii) wherein the two images are separated by a sampling interval; (iv) wherein the two images view at least a portion of the same Earth geography; and (v) wherein the radiance difference image corresponds the portion of the same Earth geography; (b) detecting candidate fires in the radiance difference image within the same Earth geography; (c) excluding from the candidate fires those that fail one or more tests to form a set of non-excluded candidate fires; (d) evaluating an importance cost of the non-excluded candidate fires; and (e) reporting the non-excluded candidate fires above a fire importance cost reporting threshold.

35. A fire urgency estimator, comprising: (a) a platform; (b) the platform comprising an imager configured to capture a plurality of Earth geographic images; (c) a processor disposed on the platform; and (d) means for reporting from the Earth geographic images one or more non-excluded candidate fires above a fire importance cost reporting threshold by processing the plurality of Earth geographic images on the processor.

36. The fire urgency estimator of claim 35, wherein the means for reporting comprises programming executable on the processor capable of performing steps comprising: (a) providing a radiance difference image by performing steps comprising: (i) acquiring at least two Earth geographic images; (ii) subtracting one Earth geographic image from another Earth geographic image to form the subtracted difference image; (iii) wherein the two images are separated by a sampling interval; (iv) wherein the two images view at least a portion of the same Earth geography; and (v) wherein the radiance difference image corresponds to the portion of the same Earth geography; (b) detecting candidate fires in the radiance difference image within the same Earth geography; (c) excluding from the candidate fires those that fail one or more tests to form a set of non-excluded candidate fires; (d) evaluating an importance cost of the non-excluded candidate fires; and (e) reporting the non-excluded candidate fires above a fire importance cost reporting threshold.

37. The fire urgency estimator of any preceding embodiment, wherein the platform comprises either: (a) a satellite in Earth orbit; or (b) a manned aerial vehicle; or (c) an unmanned aerial vehicle (UAV).

38. The fire urgency estimator of any preceding embodiment, wherein the processor disposed on the platform further comprises: (a) a ground based processor in communication with the processor physically disposed on the platform; and (b) wherein processing takes place in both the platform processor and in the ground based processor.

39. The fire urgency estimator of any preceding embodiment, wherein the imager comprises either a monospectral or multispectral imager.

40. The fire urgency estimator of any preceding embodiment, wherein the imager comprises an ability to produce dithered geographic images.

41. The fire urgency estimator of any preceding embodiment, wherein the programming executable detecting step further comprises: (a) forming a histogram of the radiance difference image; and (b) calculating one or more properties from the histogram, wherein the one or more properties are selected from the group of properties consisting of: a mean, a maximum value, a standard deviation ($\sigma$), and a full width half maximum (FWHM) value.

42. The fire urgency estimator of any preceding embodiment, wherein the step of detecting candidate fires further comprises detecting one or more fire candidates from the histogram.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

All structural, software, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

Furthermore, no element, component, or method step in the present disclosure is intended to be dedicated to the public regardless of whether the element, component, or method step is explicitly recited in the claims.

No claim element herein is to be construed as a "means plus function" element under the provisions of 35 U.S.C. 112, unless the element is expressly recited using the phrase "means for." No claim element herein is to be construed as a "step plus function" element under the provisions of 35 U.S.C. 112, unless the element is expressly recited using the phrase "step for."

TABLE 1

Signal-to-noise response assuming Poisson fluctuations are the only source of noise, for a one second exposure, 0.5 meter aperture telescope, in exemplary feasible bands.

| System Component | Response |
| --- | --- |
| Wavelengths | 3.4 to 4 µm |
| Signal detected from a 3 m × 3 m 1100 K fire (assume 10% system efficiency) at FUEGO | $1.2 \times 10^6$ photons/second detected |
| Background in One Resolution Element (assume a 290 m resolution element) | $4 \times 10^7$ photons/second detected |
| Signal to noise in One second integration (assuming Poisson counting statistics) | 190 |
| Comments | Noise will almost certainly arise from artifacts of image subtraction |

What is claimed is:

1. An apparatus for fire urgency estimation, the apparatus comprising:
   (a) an imager configured for capturing images, wherein said imager is configured for deployment within a satellite configured for orbiting Earth;
   (b) a processor configured for processing said images; and
   (c) programming executable on said processor for detecting fire locations across extensive geographic regions while suppressing false alarms by performing steps comprising:
      (i) classifying trends in response to temporal subtraction of images received by said imager over a time of seconds to minutes;
      (ii) dithering of images to improve resolution;
      (iii) adjusting detection thresholds in a time-sensitive autonomous manner to reduce false alarm rates despite constantly varying conditions; and
      (iv) generating calibrated decisions regarding fire urgency in response to steps (i) through (iii).

2. A method of fire urgency estimation for detecting fire locations across extensive geographic regions while suppressing false alarms, the method comprising:
   (a) classifying trends in response to temporal subtraction of images received by an imager over a time of seconds to minutes, wherein said images are captured by the imager integrated within a satellite orbiting Earth;
   (b) dithering of said images to improve resolution;
   (c) adjusting detection thresholds in a time-sensitive autonomous manner to reduce false alarm rates despite varying environmental conditions; and
   (d) generating calibrated decisions regarding fire urgency in response to steps (a) through (c).

3. A fire urgency estimator, comprising:
   (a) a platform comprising an imager configured to capture a plurality of Earth geographic images;
   (b) programming executable on the platform capable of performing steps comprising:
      (i) subtracting one Earth geographic image from another Earth geographic image;
         (A) wherein the two images are separated by a sampling interval to form a radiance difference image; and
         (B) wherein the two images view at least a portion of the same Earth geography;
      (ii) detecting candidate fires in the radiance difference image within the same Earth geography;
      (iii) excluding from the candidate fires those that fail one or more tests to form a set of non-excluded candidate fires;
      (iv) evaluating an importance cost of the non-excluded candidate fires; and
      (v) reporting the non-excluded candidate fires above a fire importance cost reporting threshold.

4. The fire urgency estimator of claim 3, wherein the platform comprises either:
   (a) a satellite in Earth orbit; or
   (b) a manned aerial vehicle; or
   (c) an unmanned aerial vehicle (UAV).

5. The fire urgency estimator of claim 3, wherein the platform further comprises:
   (a) a processor physically disposed proximally to the platform; or
   (b) a ground based processor; or
   (c) a distributed processor comprising:
      (i) a processor physically disposed within or proximal to the platform; and
      (ii) a ground based processor in communication with the processor physically disposed proximally to the platform;
      (iii) wherein processing takes place in both the platform processor and in the ground based processor; and
      (iv) wherein the platform processor and the ground based processor are in at least periodic communication.

6. The fire urgency estimator of claim 3, wherein the imager comprises either a monospectral or multispectral imager.

7. The fire urgency estimator of claim 6, wherein the imager comprises an ability to produce dithered geographic images.

8. The fire urgency estimator of claim 3, wherein said detecting candidate fires comprises:
   (a) forming a histogram of the radiance difference image; and (b) calculating one or more properties from the histogram, wherein the one or more properties are selected from a group of properties consisting of: a mean, a maximum value, a standard deviation ($\sigma$), and a full width half maximum (FWHM) value.

9. The fire urgency estimator of claim 8, wherein the step of detecting candidate fires further comprises detecting one or more fire candidates from the histogram.

10. The fire urgency estimator of claim 3, further comprising:
(a) a fire urgency receiver;
(b) wherein the receiver is configured to receive from the platform at least one of the reported non-excluded candidate fires above the fire importance cost reporting threshold; and
(c) wherein the receiver is configured to receive from the platform a geographic location corresponding to at least one reported non-excluded candidate fire.

11. A fire urgency estimator, comprising:
(a) a computer processor; and
(b) programming in a non-transitory computer readable medium and executable on the computer processor for performing steps comprising:
    (i) capturing a plurality of Earth geographic images by using an imager;
    (ii) subtracting one Earth geographic image from another Earth geographic image;
        (A) wherein the two images are separated by a sampling interval to form a radiance difference image; and
        (B) wherein the two images view at least a portion of the same Earth geography;
    (iii) detecting candidate fires in the radiance difference image within the same Earth geography;
    (iv) excluding from the candidate fires those that fail one or more tests to form a set of non-excluded candidate fires;
    (v) evaluating an importance cost of the non-excluded candidate fires; and
    (vi) reporting the non-excluded candidate fires above a fire importance cost reporting threshold.

12. A computer readable non-transitory storage medium comprising software configured to be run by at least one computer processor for performing steps comprising:
(a) providing a radiance difference image by performing steps comprising:
    (i) acquiring at least two Earth geographic images;
    (ii) subtracting one Earth geographic image from another Earth geographic image to form the subtracted difference image;
    (iii) wherein the two images are separated by a sampling interval;
    (iv) wherein the two images view at least a portion of the same Earth geography; and
    (v) wherein the radiance difference image corresponds the portion of the same Earth geography;
(b) detecting candidate fires in the radiance difference image within the same Earth geography;
(c) excluding from the candidate fires those that fail one or more tests to form a set of non-excluded candidate fires;
(d) evaluating an importance cost of the non-excluded candidate fires; and
(e) reporting the non-excluded candidate fires above a fire importance cost reporting threshold.

13. A fire urgency estimator, comprising:
(a) a platform;
(b) the platform comprising an imager configured to capture a plurality of Earth geographic images
(c) a processor disposed on the platform; and
(d) means for reporting from the Earth geographic images one or more non-excluded candidate fires above a fire importance cost reporting threshold by processing the plurality of Earth geographic images on the processor;
wherein the means for reporting comprises programming executable on the processor capable of performing steps comprising:
    (1) providing a radiance difference image by performing steps comprising:
        (i) acquiring at least two Earth geographic images;
        (ii) subtracting one Earth geographic image from another Earth geographic image to form the subtracted difference image;
        (iii) wherein the two images are separated by a sampling interval;
        (iv) wherein the two images view at least a portion of the same Earth geography; and
        (v) wherein the radiance difference image corresponds to the portion of the same Earth geography;
    (2) detecting candidate fires in the radiance difference image within the same Earth geography;
    (3) excluding from the candidate fires those that fail one or more tests to form a set of non-excluded candidate fires;
    (4) evaluating an importance cost of the non-excluded candidate fires; and
    (5) reporting the non-excluded candidate fires above a fire importance cost reporting threshold.

14. The fire urgency estimator of claim 13, wherein the platform comprises either:
(a) a satellite in Earth orbit; or
(b) a manned aerial vehicle; or
(c) an unmanned aerial vehicle (UAV).

15. The fire urgency estimator of claim 13, wherein the processor disposed on the platform further comprises:
(a) a ground based processor in communication with the processor physically disposed on the platform; and
(b) wherein processing takes place in both the platform processor and in the ground based processor.

16. The fire urgency estimator of claim 13, wherein the imager comprises either a monospectral or multispectral imager.

17. The fire urgency estimator of claim 16, wherein the imager comprises an ability to produce dithered geographic images.

18. The fire urgency estimator of claim 13 wherein the programming executable detecting step further comprises:
(a) forming a histogram of the radiance difference image; and
(b) calculating one or more properties from the histogram, wherein the one or more properties are selected from the group of properties consisting of: a mean, a maximum value, a standard deviation ($\sigma$), and a full width half maximum (FWHM) value.

19. The fire urgency estimator of claim 13 wherein the step of detecting candidate fires further comprises detecting one or more fire candidates from the histogram.

* * * * *